(12) United States Patent
Gupta

(10) Patent No.: US 7,502,760 B1
(45) Date of Patent: Mar. 10, 2009

(54) PROVIDING PAYMENTS AUTOMATICALLY IN ACCORDANCE WITH PREDEFINED INSTRUCTIONS

(75) Inventor: Vikas Gupta, Bangalore (IN)

(73) Assignee: Amazon Technologies, Inc., Incline Village, NV (US)

( * ) Notice: Subject to any disclaimer, the term of this patent is extended or adjusted under 35 U.S.C. 154(b) by 613 days.

(21) Appl. No.: 11/200,880

(22) Filed: Aug. 9, 2005

Related U.S. Application Data

(63) Continuation-in-part of application No. 10/894,350, filed on Jul. 19, 2004, now Pat. No. 7,383,231.

(51) Int. Cl.
*G06F 17/60* (2006.01)

(52) U.S. Cl. ............................... 705/66; 705/64; 705/67

(58) Field of Classification Search ................... 705/66, 705/67, 64
See application file for complete search history.

(56) References Cited

U.S. PATENT DOCUMENTS

| | | | | |
|---|---|---|---|---|
| 5,649,099 | A | 7/1997 | Theimer et al. | 395/187.01 |
| 6,157,920 | A | 12/2000 | Jakobsson et al. | 705/69 |
| 6,748,367 | B1 | 6/2004 | Lee | 705/66 |
| 7,113,930 | B2 * | 9/2006 | Eccles et al. | 705/65 |
| 2002/0044662 | A1 | 4/2002 | Sowler | 380/277 |
| 2002/0111886 | A1 * | 8/2002 | Chenevich et al. | 705/30 |
| 2002/0152158 | A1 | 10/2002 | Paleiov et al. | 705/39 |
| 2003/0126077 | A1 | 7/2003 | Kantor et al. | 705/40 |
| 2003/0126229 | A1 | 7/2003 | Kantor et al. | 709/217 |
| 2003/0140010 | A1 | 7/2003 | Patterson et al. | 705/76 |

FOREIGN PATENT DOCUMENTS

| | | |
|---|---|---|
| JP | 11096243 A * | 4/1999 |
| WO | WO 01/43033 A1 | 6/2001 |
| WO | WO 02/37233 A2 | 5/2002 |

OTHER PUBLICATIONS

U.S. Appl. No. 10/894,347, filed Jul. 19, 2004, Gupta.
"Paying for Music in the Internet Age," Sep. 17, 2004, retrieved Oct. 7, 2004, from http://www.npr.org/templates/story/story.php?storyId=3918234, 1 page.

(Continued)

*Primary Examiner*—Pierre E Elisca
(74) *Attorney, Agent, or Firm*—Seed IP Law Group PLLC

(57) ABSTRACT

Techniques are described for facilitating interactions between computing systems, such as by using an authorization system to automatically authorize financial payments between parties in accordance with previously specified private authorization instructions of at least one of the parties. In some situations, some or all of the payments are associated with commerce-related or other transactions, such as transactions initiated by a consumer via the Web to acquire items from a retailer. The authorization instructions may include predefined instruction sets that regulate conditions under which a potential payment can be authorized, with the instruction sets each associated in some situations with a reference. After one or more parties each supply one or more such references or otherwise indicate one or more such instruction sets for use with a potential payment, the authorization system can determine whether to authorize the payment based on whether the instruction sets are compatible or otherwise satisfied.

60 Claims, 22 Drawing Sheets

OTHER PUBLICATIONS

BitPass, Inc., "About Us," Copyright 2004, retrieved Oct. 7, 2004, from http://www.bitpass.com/learn/AboutUs/, 1 page.

BitPass, Inc., "The Easy Way to Buy Online Content and Services," Copyright 2004, retrieved Oct. 7, 2004, from http://www.bitpass.com/spend/, 1 page.

BitPass, Inc., "Spender FAQs," Copyright 2004, retrieved Oct. 7, 2004, from https://www.bitpass.com/spend/FAQ/, 4 pages.

BitPass, Inc., "The Easy Way to Sell Online Content and Services," Copyright 2004, retrieved Oct. 7, 2004, from https://www.bitpass.com/earn/, 1 page.

BitPass, Inc., "Earner FAQs," Copyright 2004, retrieved Oct. 7, 2004, from https://www.bitpass.com/earn/FAQ/, 3 pages.

Peppercoin, Inc., "What does Peppercoin do?," Copyright 2004, retrieved Oct. 7, 2004, from http://corp.peppercoin.com/company/about.shtml, 2 pages.

Peppercoin, Inc., "Increase Profits and Delight Customers with a New Class of Low-Priced Offers," Copyright 2004, retrieved Oct. 7, 2004, from http://corp.peppercoin.com/solution/overview.shtml, 2 pages.

Peppercoin, Inc., "Intelligent Aggregation™ is the Foundation," Copyright 2004, retrieved Oct. 7, 2004, from http://corp.peppercoin.com/solution/technology.shtml, 2 pages.

iEntry, Inc.®, "New PayPal Checkout Process Makes Online Shopping Easier," Feb. 20, 2004, retrieved Aug. 9, 2004, from http://www.webpronews.com/printable.php, 2 pages.

Associated Press, "Paypal to Offer Credit Lines on eBay," Jun. 25, 2004, retrieved Aug. 9, 2004, from http://www.shareholder.com/paypal/news/20040625-USarticle.htm, 1 page.

Paypal, "Paypal Announces 'PayPal Web Services'," May 3, 2004, retrieved Aug. 9, 2004, from http://www.shareholder.com/paypal/releaseDetail.cfm?ReleaseID=134353&Category=US, 2 pages.

ContentGuard®, "ContentGuard Intellectual Property Licensing," retrieved Jun. 14, 2004, from http://www.contentguard.com/patents.asp, 1 page.

"Digital Property Rights Language (DPRL)," Jun. 20, 2001, retrieved Jun. 14, 2004, from http://xml.coverpages.org/dprl.html, 5 pages.

ContentGuard® Home Page, retrieved Jun. 14, 2004, from http://www.contentguard.com/, 1 page.

ContentGuard®, "ContentGuard MPEG REL," retrieved Jun. 14, 2004, from http://www.contentguard.com/MPEGREL_home.asp, 2 pages.

InterTrust Technologies Corp., "About Digital Rights Management," retrieved Jun. 14, 2004, from http://www.intertrust.com/main/overview/drm.html, 2 pages.

PayPal, "PayPal Shopping Cart," retrieved Jul. 15, 2004, from http://www.paypal.com/cgi-bin/webscr?cmd=p/xcl/rec/sc-intro-outside, 1 page.

PayPal, "Technical Overview," retrieved Jul. 16, 2004, from http://www.paypal.com/cgi-bin/webscr?cmd=_pdn_cart_techview_outside, 2 pages.

PayPal, Inc., "PayPal® Integration Guide," May 2004, retrieved from http://www.eliteweaver.co.uk/downloads/integration_guide.pdf, pp. 1-157, Copyright 2004.

Identrus LLC, "Identrus Unveils World's First Global, Bank-Backed B2B e-Payments Solution Standard," Dec. 17, 2001, retrieved Jul. 16, 2004, from http://www.identrus.com/company/press_releases/us/release_011217.html, 2 pages.

"PKI-Enabled B2B Payment Products," SystemNews, Inc., Sun One, vol. 31, Issue 1, Article # 2619, Sep. 11, 2000, retrieved Jul. 16, 2004, from http://sun.systemnews.com/articles/31/1/iplanet/2619, 3 pages.

Identrus LLC, "Identrus Member Financial Institutions Develop Internet Payment Initiation Services," Sep. 11, 2000, retrieved Jul. 19, 2004, from http://www.identrus.com/company/press_releases/us/release_000911_a.html, 1 page.

Pay Pal, "Common Questions About Verification," accessed Mar. 12, 2005, URL=https://www.paypal.com/us/cgi-bin/webscr?cmd=p/pop/verification_about, 2 pages.

Pay Pal, "PayPal Web Services & Developer Central," accessed Sep. 21, 2004, URL=http://www.paypal.com/cgi-bin/webscr?cmd=p/pdn/devcentral_landing-outside, 1 page.

Vertical Web Media, "More Web Retailers Will Check Out E-checks," Sep. 9, 2004, accessed Sep. 21, 2004, URL=http://www.internetretailer.com/printArticle.asp?id=12844, 1 page.

Sales Masters World, "Top 5 Reasons Your Business Needs ACH* Processing," accessed Sep. 21, 2004, URL=http://www.sales-masters-world.com/printpage.php/ACH-processing/, 2 pages.

NACHA, "What is ACH?," accessed Mar. 16, 2005, URL=http://www.nacha.org/About/what_is_ach_.htm, 2 pages.

Lomuscio, A., et al., "A Classification Scheme for Negotiation in Electronic Commerce," *Agent-Mediated Electronic Commerce: A European AgentLink Perspective. Springer Verlag*, pp. 19-33, Mar. 31, 2000.

Tsvetovatyy, M., et al., "MAGMA: An Agent-Based Virtual Market for Electronic Commerce," *Journal of Applied Artificial Intelligence*, 11(6):501-523, 1997.

Yahoo! Inc., "Welcome to Yahoo! Bill Pay," accessed Aug. 4, 2005, URL=http://finance.yahoo.com/bp, 1 page.

Yahoo! Inc., "Bill Pay Tour—Welcome!," accessed Aug. 4, 2005, URL=http://help.yahoo.com/help/fin/bills/tour/tour-01.html, 1 page.

Yahoo! Inc., "Bill Pay Tour—Home," accessed Aug. 4, 2005, URL=http://help.yahoo.com/help/us/fin/bills/tour/tour-02.html, 2 pages.

Yahoo! Inc., "Bill Pay Tour—Make Payment," accessed Aug. 4, 2005, URL=http://help.yahoo.com/help/us/fin/bills/tour/tour-03.html, 1 page.

Yahoo! Inc., "Bill Pay Tour—Payment History," accessed Aug. 4, 2005, URL=http://help.yahoo.com/help/us/fin/bills/tour/tour-04.html, 1 page.

Yahoo! Inc., "Bill Pay Tour—Payee List," accessed Aug. 4, 2005, URL=http://www.help.yahoo.com/help/us/fin/bills/tour/tour-05.html, 1 page.

Yahoo! Inc., "Bill Pay Tour—Customer Care," accessed Aug. 4, 2005, URL=http://help.yahoo.com/help/us/fin/bills/tour/tour-06.html, 1 page.

Yahoo! Inc., "Bill Pay Tour—A Sample Electronic Billl," accessed Aug. 4, 2005, URL=http://help.yahoo.com/help/us/fin/bills/tour/tour-07.html, 2 pages.

Yahoo! Inc., "Bill Pay Tour—End of Tour," accessed Aug. 4, 2005, URL=http://help.yahoo.com/help/us/fin/bills/tour/tour-08.html, 1 page.

Yahoo! Inc., "Yahoo! Finance—Account Information Help," accessed Aug. 4, 2005, URL=http://help.yahoo.com/help/us/fin/bills/acct, 4 pages.

Yahoo! Inc., "What is Yahoo Bill Pay?," accessed Aug. 4, 2005, URL=http://help.yahoo.com/help/us/fin/bills/bills-01.html, 1 page.

Yahoo! Inc., "How Does Yahoo! Bill Pay Work?," accessed Aug. 4, 2005, URL=http://help.yahoo.com/help/us/fin/bills/bills-02.html, 2 pages.

Yahoo! Inc., "Upcoming Payments Help," accessed Aug. 4, 2005, URL=http://help.yahoo.com/help/us/fin/bills/upcoming/, 8 pages.

Yahoo! Inc., "Making Payments Help," accessed Aug. 4, 2005, URL=http://help.yahoo.com/help/us/fin/bills/make/, 6 pages.

Yahoo! Inc., "Payment History Help," accessed Aug. 4, 2005, URL=http://help.yahoo.com/help/us/fin/bills/history/, 4 pages.

Yahoo! Inc., "Payee List Help," accessed Aug. 4, 2005, URL=http://help.yahoo.com/help/us/fin/bills/payees/, 9 pages.

Yahoo! Inc., "What is a Yahoo! Security Key?," accessed Aug. 4, 2005, URL=http://help.yahoo.com/help/skey/skey-01.html, 1 page.

Yahoo! Inc., "How Does the Security Key Work Technically?," accessed Aug. 4, 2005, URL=http://help.yahoo.com/help/skey/skey-10.html, 2 pages.

Yan, G., et al., "Toolkits for a Distributed, Agent-Based Web Commerce System—Introduction," Dec. 6, 1998, accessed Aug. 4, 2005, URL=http://www.webdevelopersjournal.com/articles/ecommerce/yan01.html, 3 pages.

Yan, G., et al., "Toolkits for a Distributed, Agent-Based Web Commerce System—Agent-Based Web Commerce System," Dec. 6, 1998, accessed Aug. 4, 2005, URL=http://www.webdevelopersjournal.com/articles/ecommerce/yan02.html, 3 pages.

Yan, G., et al., "Toolkits for a Distributed, Agent-Based Web Commerce System—Seller Software Toolkit," Dec. 6, 1998, accessed Aug. 4, 2005, URL=http://www.webdevelopersjournal.com/articles/ecommerce.yan03.html, 4 pages.

Yan, G., et al., "Toolkits for a Distributed, Agent-Based Web Commerce System—Buyer Software Toolkit," Dec. 6, 1998, accessed Aug. 4, 2005, URL=http://www.webdevelopersjournal.com/articles/ecommerce/yan04.html, 4 pages.

Yan, G., et al., "Toolkits for a Distributed, Agent-Based Web Commerce System—Directory Agent," Dec. 6, 1998, accessed Aug. 4, 2005, URL=http://www.webdevelopersjournal.com/articles/ecommerce/yan05.html, 3 pages.

Yan, G., et al., "Toolkits for a Distributed, Agent-Based Web Commerce System—Agent Interactions," Dec. 6, 1998, accessed Aug. 4, 2005, URL=http://www.webdevelopersjournal.com/articles/ecommerce/yan06.html, 3 pages.

Yan, G., et al., "Toolkits for a Distributed, Agent-Based Web Commerce System—Related Work," Dec. 6, 1998, accessed Aug. 4, 2005, URL=http//www.webdevelopersjournal.com/articles/ecommerce/yan07.html, 3 pages.

Yan, G., et al., "Toolkits for a Distributed, Agent-Based Web Commerce System—Summary & References," Dec. 6, 1998, accessed Aug. 4, 2005, URL=http://www.webdevelopersjournal.com/articles/ecommerce/yan08.html, 3 pages.

* cited by examiner

Example Interactive Creation Of User Account By Web Service Provider ABC

Welcome, Web Service Provider ABC! Please provide the information below
to create your account for use with the WS Payment Handler System ("PHS"). ⎬ 111

1. Specify a name and password for your account.

name: [ WSP-ABC ]    password: [ ******** ]
optional organization affiliation(s): [ ABC; Certified Web Service Provider Association ]
optional certification(s): [ BCDCorp:Trusted ] ⎬ 113

2. Optionally specify one or more payment repositories for payments that you receive.
Your PHS account (named "MyPHSAccount") can also be used as a payment repository.

| Repository Name & Type | Repository Number & Expiration | Restrictions | |
|---|---|---|---|
| [ABC-Biz] [bank account ▽] | [123456789-123-456789] [<none>] | [<none> ▽] | [ ] |
| [PerDCard] [debit card ▽] | [1234-5678-1234-5678] [12/96] | [min. pay. ▽] | [$0.05] |
| [ ] [<none> ▽] | [ ] [ ] | [<none> ▽] | [ ] |

⋮   ⎬ 114

3. Optionally specify one or more payment instruments for payments that you make.
Your PHS account can also be used as a payment instrument up to a $1000 limit.

| Repository Name & Type | Repository Number & Expiration | Restrictions | |
|---|---|---|---|
| [ABC-Biz] [bank account ▽] | [123456789-123-456789] [<none>] | [max. pay. ▽] | [$50.] |
| [PerCCard] [credit card ▽] | [1234-5678-5678-1234] [01/96] | [max. bal. ▽] | [$2000.] |
| | | [AND ▽] [max. pay. ▽] | [$200.] |
| [ ] [<none> ▽] | [ ] [ ] | [<none> ▽] | [ ] |

⎬ 115

[ Create Account ]   ⎬ 116

*Figure 1A*

Example Interactive Creation Of Usage Instruction Rule Set By Web Service Provider User ABC Welcome, Web Service Provider ABC! Please provide the information below to create a usage instruction rule set for use with your WSP-ABC account. ⎬ 117 usage instruction rule set name: [TrustedCustomerOfMyMapService]
for use as: [payment-recipient ▽]   payment repository: [PerDCard ▽]
expiration date: [<none>]

Specify one or more rules for this usage instruction rule set.

| Rule Attribute | | Criteria | | Value |
|---|---|---|---|---|
| [AllowedPayers ▽] | | [Payer.OrganizationAffiliation ▽] | [IS ▽] | [Company XYZ] |
| | [OR ▽] | [Payer.Rating ▽] | [IS ▽] | [BCDCorp:Trusted] |
| | [OR ▽] | [Payer.ID ▽] | [IS ▽] | [4215345829] |
| [DisputeResolutionPolicy ▽] | | | | [exclusive remedy is refund ▽] |

[ ▽ ]

| AllowedPayers | *(default value: <all>)* |
| DisallowedPayers | *(default value: <none>)* |
| AllowedTransactionTypes | *(default value: <all>)* |
| DisallowedTransactionTypes | *(default value: <none>)* |
| DisputeResolutionPolicy | *(default value: <any>)* |
| DisputeTimeWindow | *(default value: 30 days)* |
| AllowedPaymentInstrumentTypes | *(default value: <all>)* |
| DisallowedPaymentInstrumentTypes | *(default value: <none>)* |
| AllowedCurrencies | *(default value: US dollars)* |
| DisallowedCurrencies | *(default value: <all>)* |

⋮

---OR---
<User-Defined-Rule ("UDR")>

⎬ 118

[ Create Current Usage Instruction Rule Set And Continue With Another ]

[ Create Current Usage Instruction Rule Set And Exit ]

[ Skip Usage Instruction Rule Set Creation And Exit ]

Docket No. 120137.504
Inventor(s): Vikas Gupta
Express Mail No. EV530952595US

Example Programmatic Creation Of Usage Instruction Rule Sets Using XML Documents By Application Developer User CDE

```
<?xml version="1.0" ?>
<!DOCTYPE usage-instruction-rule-set >

<USAGE-INSTRUCTION-RULE-SET>
    <ACCOUNT-ID>1348193287</ACCOUNT-ID>
    <UIRS-NAME>MyPremiumCommercialApplications</UIRS-NAME>
    <UIRS-USAGE>payment provider</UIRS-USAGE>
    <UIRS-PAYMENT-INSTRUMENT>MyPHSAccount</UIRS-PAYMENT-INSTRUMENT>
    <UIRS-EXPIRATION-DATE>01-01-2005</UIRS-EXPIRATION-DATE>
    <UIRS-RULES>
        <RULE>
            <RULE-ATTRIBUTE>Recipient</RULE-ATTRIBUTE>
            <RULE-CRITERIA>Recipient.ID</RULE-CRITERIA>
            <RULE-EVALUATION>IS-NOT</RULE-EVALUATION>
            <RULE-VALUE>6242453245</RULE-VALUE>  </RULE>
        <RULE>
            <RULE-ATTRIBUTE>PaymentsAllowed</RULE-ATTRIBUTE>
            <RULE-EVALUATION>LESS-OR-EQUAL</RULE-EVALUATION>
            <RULE-VALUE>$1000</RULE-VALUE>  </RULE>
    </UIRS-RULES>
</USAGE-INSTRUCTION-RULE-SET>
```
⎫
⎬ 131
⎭

```
<?xml version="1.0" ?>
<!DOCTYPE usage-instruction-rule-set >

<USAGE-INSTRUCTION-RULE-SET>
    <ACCOUNT-ID>1348193287</ACCOUNT-ID>
    <UIRS-NAME>SharewareApplicationAAA</UIRS-NAME>
    <UIRS-USAGE>access-authorizer</UIRS-USAGE>
    <UIRS-ACCESS-INFORMATION>
        <USERNAME>CDE-Company</USERNAME>
        <PASSWORD>aldkf32aM</PASSWORD>
    </UIRS-ACCESS-INFORMATION>
    <UIRS-RULES>
        <RULE>
            <RULE-ATTRIBUTE>User-Defined-Rule</RULE-ATTRIBUTE>
            <RULE-UDR-NAME>Allowed-Use</RULE-UDR-NAME>
            <RULE-INVOCATION>
                http://verify.cde.com/query?app=AAA&destination=[access-provider.name]
            </RULE-INVOCATION >  </RULE>
    </UIRS-RULES>
</USAGE-INSTRUCTION-RULE-SET>
```
⎫
⎬ 133
⎭

*Figure 1C*

Example WS Payment Handler System Databases

Account DB

| | 141 | 142 | 143 | 144 | 145 | 146 | 147 | 148 | 149 | 150 |
|---|---|---|---|---|---|---|---|---|---|---|
| | Account ID | User ID | Name | Password | Organization Affiliations | Certifications | Payment Repository IDs | Payment Instrument IDs | Current Account Balance | Maximum Account Balance |
| 140a | 3419872987 | 0819343244 | WSP-ABC | q3adouRT | ABC; Certified Web Service Provider Association | BCDCorp: Trusted | 3419811; 3204980 | 3419821; 3947429 | - | $1000. |
| 140b | 1348193287 | - | CDE-Corp | - | - | BCDCorp: Trusted | - | - | $231.25 | $500. |
| | ... | | | | | | | | | |

Payment Repository DB

| | 181 | 182 | 183 | 184 | 185 | 186 | 187 | 188 |
|---|---|---|---|---|---|---|---|---|
| | Payment Repository ID | Account ID | Name | Type | Number | Expiration Date | Restriction Types | Restriction Values |
| 180a | 3419811 | 3419872987 | ABC-Biz | bank account | 123456789-123-456789 | - | - | - |
| 180b | 3204980 | 3419872987 | PerDCard | debit card | 1234-5678-1234-5678 | 12/96 | min. pay | $0.05 |
| | ... | | | | | | | |

Payment Instrument DB

| | 191 | 192 | 193 | 194 | 195 | 196 | 197 | 198 |
|---|---|---|---|---|---|---|---|---|
| | Payment Instrument ID | Account ID | Name | Type | Number | Expiration Date | Restriction Types | Restriction Values |
| 190a | 3419821 | 3419872987 | ABC-Biz | bank account | 123456789-123-456789 | - | max. pay. | $50. |
| 190b | 3947429 | 3419872987 | PerCCard | credit card | 1234-5678-5678-1234 | 01/96 | max. bal.; max. pay. | $2000.; $200. |
| 190c | 7982348 | 8049582022 | CC1 | credit card | 0984-4328-2452-6754 | 03/98 | max. bal. | $10000. |
| | ... | | | | | | | |

*Figure 1D*

Usage Instruction Rule Set DB

| | UIRS ID | Account ID | Usage Token | Name | Use Type | Payment Repository/ Instrument | Expiration Date | Rule IDs |
|---|---|---|---|---|---|---|---|---|
| | *161* | *162* | *163* | *164* | *165* | *166* | *167* | *168* |
| 160a | 243919845 | 3419872987 | 84331984091340 | TrustedCustomerOfMyMapService | payment-recipient | 3204980 | | 0298452; 2343248 |
| 160b | 341290809 | 1348193287 | 74993279274592 | MyPremiumCommercialApplications | payment-provider | 1348193287 | 01/01/2005 | 0984970; 2934701 |
| | ... | | | | | | | |

Usage Instruction Rule DB

| | Rule ID | UIRS ID | Rule Attribute | Criteria | Evaluation | Value | Connector |
|---|---|---|---|---|---|---|---|
| | *171* | *172* | *173* | *174* | *175* | *176* | *177* |
| 170a | 0298452 | 243919845 | Payer | Payer.Organization.Affiliation; Payer.Rating; Payer.ID | IS; IS; IS; | Company XYZ; BCDCorp:Trusted; 4215345829 | OR; OR |
| 170b | 2343248 | 243919845 | DisputeResolutionPolicy | - | IS; | exclusive remedy is refund | - |
| 170c | 0984970 | 341290809 | Recipient | Recipient.ID | IS-NOT; | 6242453245 | - |
| 170d | 2934701 | 341290809 | PaymentsAllowed | - | LESS-OR-EQUAL; | $1000. | - |
| | ... | | | | | | |

*Figure 1E*

Docket No. 120137.504
Inventor(s): Vikas Gupta
Express Mail No. EV530952595US

Example Interactive Creation Of User Account By Consumer CCC

Welcome, User CCC! Please provide the information below to create
your account for use with the Payment Handling System ("PHS"). ⎫ 101

1. Specify a name and password for your account.

name: [CCC-Personal]          password: [********]  ⎫ 103
optional organization affiliation(s): [                    ]
optional certification(s): [                    ]

2. Optionally specify one or more payment repositories for payments that you receive.

| Repository Name & Type | Repository Number & Expiration | Restrictions |
|---|---|---|
| [      ] [<none> ▽] | [          ] [     ] | [<none> ▽] [   ] |
| ⋮ | | |

⎫ 104

3. Optionally specify one or more payment instruments for payments that you make.

| Repository Name & Type | Repository Number & Expiration | Restrictions | |
|---|---|---|---|
| [PersBank] [bank account ▽] | [123456789-987-654321] [<none>] | [max. pay. ▽] | [$300.] |
| [PerCCard] [credit card ▽] | [1234-1234-5678-5678] [01/06] | [max. bal. ▽] | [$2000.] |
| | | [AND ▽] [max. pay. ▽] | [$200.] |
| [      ] [<none> ▽] | [          ] [     ] | [<none> ▽] | [   ] |
| ⋮ | | | |

⎫ 105

[Create Account]  ⎤ 106

*Figure 1F*

Docket No. 120137.504
Inventor(s): Vikas Gupta
Express Mail No. EV530952595US

Example Interactive Creation Of Payment Instruction Set By Consumer CCC

Welcome, User CCC! Please provide the information below to create a payment instruction set for use with your "CCC-Personal" account. ⎫—107 payment instruction set name: [OnlineShopping]
expiration date: [01/01/2006]
for use as: [payment-provider ▽]  payment instrument: [PersBank ▽]

Specify one or more conditions for this payment instruction set.

| Attribute | | Value | |
|---|---|---|---|
| TransactionAmount | ▽ | <= ▽ | $100 |
| SenderFractionOfFees | ▽ | = ▽ | $0 |
| InstructionSetUseCount | ▽ | <= ▽ | 100 |
| DisputeResolutionPolicy | ▽ | (default) 30-day full refund | ▽ |
| MyRole | ▽ | sender | ▽ |

[ ▽ ]

AllowedRecipients           *(default value: <all>)*
DisallowedRecipients        *(default value: <none>)*

AllowedTransactionTypes     *(default value: <all>)*
DisallowedTransactionTypes  *(default value: <none>)*
DisputeResolutionPolicy     *(default value: <any>)*
DisputeTimeWindow           *(default value: 30 days)*

AllowedPaymentRepositoryTypes    *(default value: <all>)*
DisallowedPaymentRespositoryTypes *(default value: <none>)*
AllowedCurrencies           *(default value: US dollars)*
DisallowedCurrencies        *(default value: <all>)*

．
．
．
---OR---
<User-Defined-Condition ("UDC")>

⎬—108

[ Create Current Payment Instruction Set And Continue With Another ]
[ Create Current Payment Instruction Set And Exit ]
[ Skip Payment Instruction Set Creation And Exit ]

Example Shopping Screen For Consumer CCC

Welcome, User CCC. }— 122

[ Summary Description Of Item XYZ ] }— 121

[ Add To Shopping Cart ] }— 123

OR

[ Buy It Now ]   — 125a

Payment Option:
| OnlineShopping PIS | ▽ |   — 125b
| OnlineShopping PIS |   — 125c
| PerCCard |   — 125d  } 125

Ship to:
| HomeAddress-1 | ▽ |   — 125e

☐ Add gift-wrap/note   — 125f

[ Detailed Description Of Item XYZ ] }— 127

*Figure 1H*

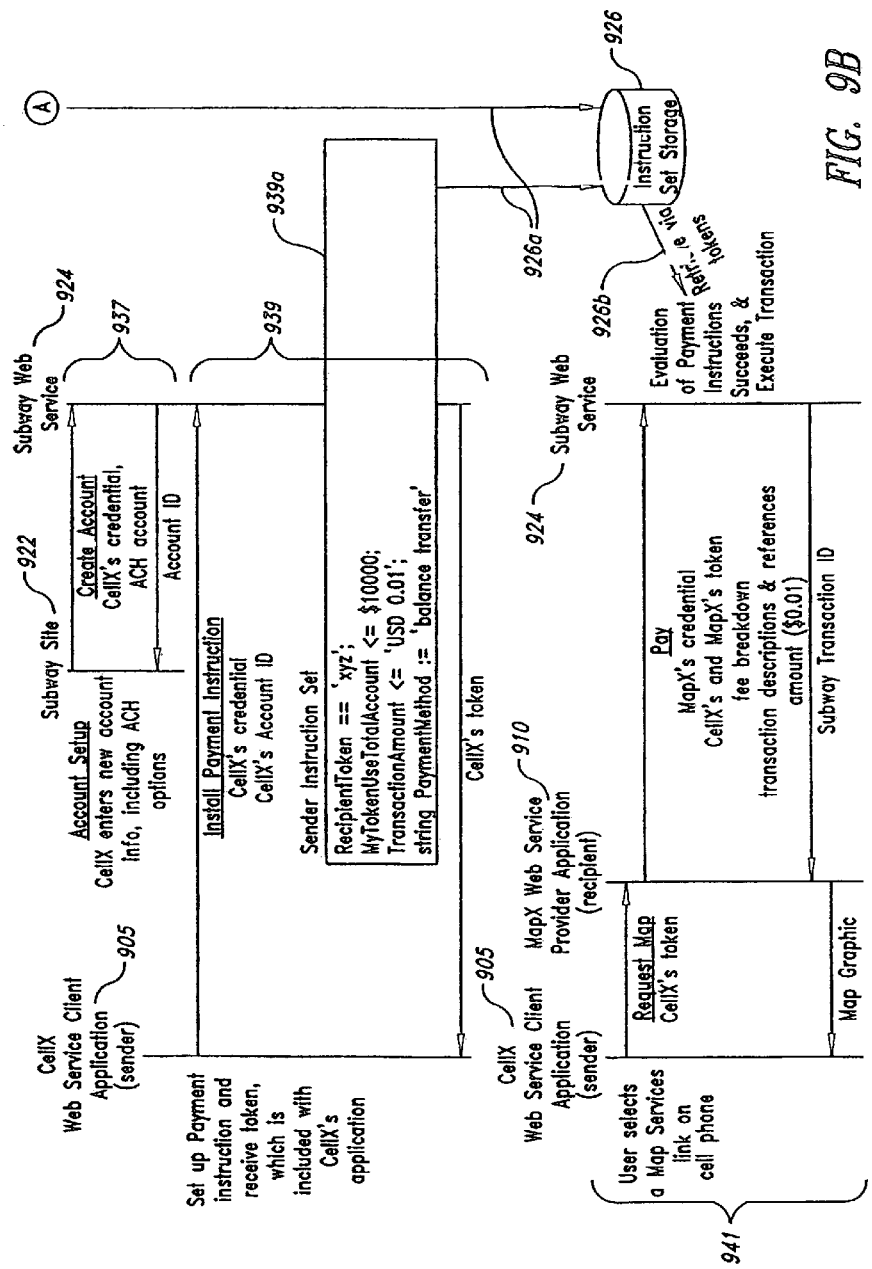

PROVIDING PAYMENTS AUTOMATICALLY IN ACCORDANCE WITH PREDEFINED INSTRUCTIONS

CROSS REFERENCE TO RELATED APPLICATIONS

This application is a continuation-in-part of U.S. patent application Ser. No. 10/894,350, filed Jul. 19, 2004, and entitled "Performing Automatically Authorized Programmatic Transactions," which is hereby incorporated by reference in its entirety.

TECHNICAL FIELD

The following disclosure relates generally to facilitating interactions between computing systems, and more particularly to automatically providing payments for transactions between parties in accordance with predefined instructions of at least one of the parties.

BACKGROUND

Various mechanisms exist to allow computers and executing software applications to programmatically interact. For example, remote procedure call ("RPC") protocols have long existed that allow a program on one computer to cause a program on another computer to be executed, and various object-oriented architectures such as CORBA ("Common Object Request Broker Architecture"), DCOM ("Distributed Component Object Model"), Java RMI ("Remote Method Invocation"), JavaSpaces, Jini, JXTA, and UPnP ("Universal Plug-n-Play") provide similar capabilities. In addition, a variety of middleware programs have been implemented to connect separate applications (often of distinct types and from unrelated sources) to allow communication. For example, various EDI ("Electronic Data Interchange") networks exist that provide standard various EDI ("Electronic Data Interchange") networks exist that provide standard mechanisms to allow a computer system of one user of the network to send data to a computer system of another user of the network.

The widespread popularity of the World Wide Web ("Web") has provided additional opportunities for computers to inter-communicate and for users to obtain various capabilities. For example, much current Web use involves users interactively requesting Web pages from Web servers (e.g., via executing Web browser applications of the users) and receiving the requested information in response. Such Web use has increasingly provided a medium for users to engage in shopping and other commerce-related transactions, such as to allow users to search for and order items (such as products, services and/or information) that are available for purchase, rent, lease, license, trade, evaluation, sampling, subscription to, etc. In many circumstances, a user can visit the Web site of a Web merchant or retailer (also referred to as a "Web store") or other online or electronic marketplace that sells one or more items, and can view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

In addition to such interactive user specification of requested information, there is also growing use of the Web to support the programmatic interaction of remote applications to exchange information via defined APIs ("application program interfaces"), such as via Web services. Web services allow heterogeneous applications and computers to interact, and can be defined and implemented using a variety of underlying protocols and techniques. For example, some Web service implementations return data in computer-readable XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocation interfaces (e.g., using XML format), and UDDI ("Universal Description, Discovery, and Integration service") for discovery of available services.

Although the Web allows users to engage in shopping and other commerce-related transactions involving the exchange of monetary payments, a variety of problems related to making such payments exist. For example, although using credit cards to make payments provides some benefits to purchasers (e.g., refunds for at least some unauthorized charges, such as when a credit card number is stolen), various drawbacks exist to credit card use, such as that many purchasers do not have credit cards (or available credit on their credit cards), many sellers do not accept credit cards, and the fees charged by credit card companies can be problematic (e.g., transaction-based fees charged to sellers). In at least some circumstances, debit-based payments via electronic funds transfer ("EFT") from a financial account of the purchaser (e.g., payments from a purchaser's bank account using the ACH, or "Automated Clearing House," system) may have advantages over credit card use (e.g., lower fees, greater availability to purchasers, and/or greater acceptance by sellers), but purchasers may have less protection from fraudulent activity on their accounts than from credit card use, and may be reluctant to provide the necessary account-related details to a seller to enable the EFT. Moreover, other types of payments have other drawbacks, such as the increased risk to the seller that arises for payments scheduled to occur after delivery of purchased items (e.g., based on invoicing the purchaser), and delays and risks in using paper bank checks (e.g., delays in obtaining a check from a purchaser and in verifying the corresponding availability of funds, and risks that sufficient funds are not available).

BRIEF DESCRIPTION OF THE DRAWINGS

FIGS. 1A-1I illustrate examples of defining and using usage instruction sets for use in authorizing payments and transactions.

FIGS. 8A-8C, 9A-9B, and 10A-10C illustrate examples of types of payments and other interactions between parties to transactions.

DETAILED DESCRIPTION

Figure 11:
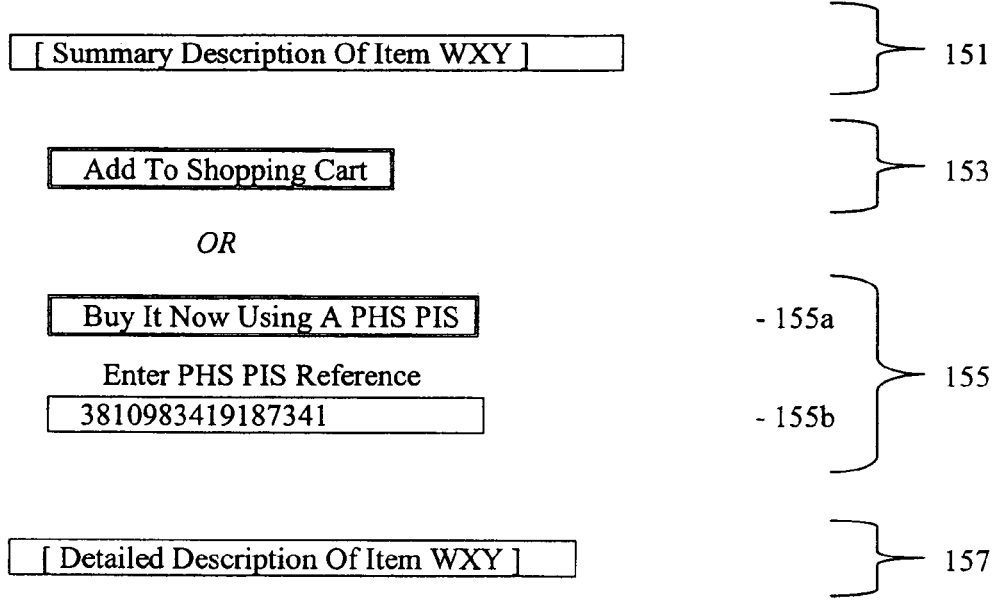

A software facility is described that facilitates interactions between computing systems, such as by in some embodiments providing a third-party authorization system that automatically authorizes financial payments between parties in accordance with previously specified private authorization instructions of at least one of the parties. In some embodiments, some or all of the payments are associated with commerce-related or other transactions having associated financial payments, such as transactions initiated by a consumer via the Web to acquire one or more items from a merchant. In addition, in some embodiments the authorization system further provides authorized payments to one or more of the parties on behalf of one or more other parties.

In particular, potential consumers or other users who may desire to make financial payments to others may first define usage instruction sets with the authorization system, such as payment usage instruction sets for later use in authorizing financial payments (e.g., payments associated with transactions to which the user is a party) and/or fee-based transactions. In some embodiments, such users may specify such payment instruction sets in such a manner as to control debit-based payments made from one or more bank accounts of the user via the ACH ("Automated Clearing House") system, or more generally in some embodiments to control any type of electronic funds transfer from a financial account of the user related to a debit transaction or from another related payment source associated with the user (e.g., stored value cards, gift cards, gift certificates, etc.).

Each such payment instruction set or other set of payment authorization instructions for a user may specify a variety of types of conditions related to whether payments are determined to be authorized, and may further specify the conditions in a variety of manners (e.g., by using one or more specified rules that regulate the conditions under which payment is authorized). For example, a user may specify restrictions for a payment instruction set that limits the financial exposure to the user of the transactions that can be authorized by that payment instruction set (e.g., via a number of times that the payment instruction set can authorize a transaction, a maximum payment amount per transaction that the payment instruction set can authorize, a maximum total payment amount that the payment instruction set can authorize, an expiration date for the payment instruction set, restrictions on what other users (if any) can use the payment instruction set to authorize payments, etc.). Additional details regarding such payment instruction sets are discussed elsewhere.

In addition, in at least some embodiments each such payment instruction set is associated with one or more financial accounts or other payment sources from which financial payments may be obtained and/or to which financial payments may be made. In some such embodiments, the authorization system will also verify the financial accounts or other payment sources before enabling the use of an associated payment instruction set, such as by verifying a checking or savings bank account by making one or more small deposits or withdrawals, and optionally verifying that the user can provide information about those transactions (so as to increase the likelihood that the financial account exists and that the user has access to monthly statements or other information about the account), while in other embodiments no such verification may be performed for at least some types of financial accounts or other payment sources. Moreover, in at least some embodiments the authorization system may take further action to verify other information about the user (whether in addition to or instead of verifying the financial accounts), such as to corroborate a user's identity and/or indicated attributes based on evidence from third parties (e.g., a government-issued driver's license or passport) or in other manners.

After receiving a specified payment or other usage instruction set for a user, the authorization system stores the instruction set in a manner associated with the user (e.g., associates it with an account of the user with the authorization system), optionally after first approving the instruction set (e.g., based on verification that the instruction set includes required information, if any, and/or is in the correct form). The authorization system also in at least some embodiments generates one or more references for later use in referring to the instruction set, associates the reference(s) with the instruction set (e.g., by storing an indication of the reference(s) with the stored instruction set), and in some such embodiments provides the reference(s) to the user for later use. As discussed in greater detail elsewhere, the reference can be generated in a variety of ways and can take a variety of forms (e.g., as a token in numerical or other form, such as a long random number guaranteed to be unique), including being generated in such a manner as to allow anonymous and/or private use of a reference by a user, such as by lacking any identification information related to the user and/or by lacking any information about the instruction set associated with the reference (e.g., to prevent other parties to a potential transaction that involves such a reference from obtaining such information about the user, about the associated instruction set and its conditions, and/or about any financial accounts with which the instruction set is associated).

After a payment or other usage instruction set has been defined, the instruction set can then be used to allow automatic authorization of a financial payment or to otherwise authorize a transaction in accordance with the previously defined conditions of the instruction set. For example, in some embodiments a consumer may interact with a Web merchant or other online retailer in order to specify one or more items to be acquired, and then may indicate an instruction set of the consumer to be used as a source of payment for the acquisition of the items. After the authorization system receives an indication of the instruction set (e.g., an associated reference, whether received directly from the consumer or from the retailer after the consumer supplies the reference to the retailer) and information about the potential financial payment from the consumer to the retailer for the item acquisition transaction (e.g., along with other information about the transaction and the retailer), the authorization system determines whether the payment is authorized and provides a corresponding response.

In some embodiments, the authorization system may further assist in providing the payment from the consumer to the retailer, such as by debiting a financial account of the consumer (e.g., by using the ACH system to debit a bank account of the consumer, such as with the authorization system acting as the payment recipient, or instead by directly debiting an account of the consumer with the authorization system or an affiliated system) and crediting an account of the retailer (e.g., by using the ACH system to credit a bank account of the retailer, such as with the authorization system acting as the payment provider, or instead by directly crediting an account of the retailer with the authorization system or an affiliated system). Further, the authorization system may in some embodiments obtain payment for providing the authorization functionality from the consumer and/or the retailer, such as by debiting their financial accounts (e.g., by charging a fixed fee per payment or transaction, such as five cents, or instead by varying the fee based on the amount of the payment or other factor). As discussed in greater detail elsewhere, including with respect to FIGS. 8A-10C, payment and other usage instruction sets and their associated references may further be used in a wide variety of other situations and manners (e.g., as part of programmatic transactions conducted between executing computer programs, such as a transaction involving the use of one or more Web services of one or more Web service providers by one or more application programs affiliated with one or more Web service consumers).

FIGS. 1F-1G provide examples of interactions by a user to create an account and a payment instruction set for later use in authorizing payments for purchases and other transactions, and FIGS. 1H-1I provide examples of interactions by the user to use the payment instruction set for such transactions. In particular, FIG. 1F provides an example of a GUI ("graphical user interface") via which a consumer user CCC interactively creates a user account, such as by filling in forms in a Web page provided by an account creation component of an example Payment Handling System ("PHS") authorization system. In this illustrated example, the example interactive creation screen includes a heading area 101 with overview information, followed by an area 103 in which the user can specify various general information for the account, such as an account name, a password for access control to view and modify the account, and other optional information related to the user. While not illustrated here, in some embodiments a variety of other types of information may be specified by a user for use with an account, such as address information (e.g., for use in shipping physical items to the user), demographic information, etc.

In this example, the account creation screen also includes a section 105 in which the user CCC can specify one or more payment instruments to be used for payments to be made to others. In this example, user CCC specifies a bank account as an available payment instrument, although with a restriction that any individual payments from the account be no larger than $300, as well as a personal credit card payment instrument with restrictions of maximum individual payments of $200 and a maximum cumulative balance of $2,000. While not illustrated here, in some embodiments the user account being created may also be available for use as an additional payment instrument, such as based on funds pre-deposited in the account and/or based on credit provided to the user by the PHS system. The account creation screen also includes an optional section 104 in which the user CCC can specify one or more payment repositories (e.g., the previously specified bank account) for payments that the user may receive, such as for monetary refunds that are not credited to a previously used payment instrument. In this example, no repositories have yet been specified, and in some embodiments the user account being created may also be available for use as a payment repository. After specifying the various types of information, the user can then select the control 106 to cause the account to be created.

In the illustrated embodiment, the user is next presented with the option of creating one or more payment or other usage instruction sets via the example screen shown in FIG. 1G. In particular, the illustrated screen includes a header section 107 with overview information and a specification section 108 in which various conditions can be specified for a payment instruction set being created. In this example, section 108 allows the user to specify a name for the payment instruction set (which the user in this example designates "OnlineShopping"), an expiration date for the instruction set (which in this example is "Jan. 1, 2006"), a usage type for the instruction set (which in this example is to provide payments), and a payment instrument from which to provide any such payments. The user CCC can also specify one or more specific conditions for use in determining whether this instruction set authorizes a specific payment. In this example, five such conditions have been defined, with each condition in this example including an attribute (e.g., attributes related to a payment amount or to various aspects of a transaction with which the payment is associated) and indications of one or more corresponding allowed or prohibited values for that attribute. In addition, a drop-down menu for a sixth condition shows various other types of attributes that can be selected and customized for this payment instruction set in this example. Such conditions may be stored and used by the PHS system in various ways (e.g., as rules), and in other embodiments may be specified in a variety of other manners (e.g., by having the user supply a script or other executable code that when executed will provide an indication of whether a proposed payment is authorized).

In particular, in this example user CCC has specified that this payment instruction set will only authorize payments that do not exceed $100, despite the underlying bank account payment instrument in this example allowing payments of up to $300 (as specified in section 105 of FIG. 1F)—thus, user CCC may, for example, define another payment instruction set for use with the bank account that will authorize payments above $100 but not more than $300. Other illustrated conditions include that the payment instruction set will only authorize 100 total payments (e.g., to limit financial exposure to user CCC if other users are allowed to use this payment instruction set), that the payment instruction set is only for use when the user is acting as the sender of a payment, that the user will not authorize any transaction fees separate from the payment, and that the user will receive at least a 30-day full refund policy. After specifying the various information for the payment instruction set being created, the user CCC can then select one of the controls in section 109 to create the current payment instruction set and continue with creating another instruction set for the user's account (e.g., another payment instruction set for use with the same bank account), to create the current payment instruction set and exit the account modification, or to skip the creation of a current payment instruction set and exit. Once created, the various information regarding the payment instruction set will be stored for later use.

Specific attribute examples and types of attributes are shown in this example for illustrative purposes and are provided in a simplified manner for the purpose of example, and similar information could instead be specified in other ways in other situations. For example, various other example attributes are presented in this example that can be used for specified conditions, including allowed or disallowed recipients to whom user CCC may send payment, allowed or disallowed transaction types with which the payment instruction set can be used, allowed or disallowed types of payment repositories to which payment will be sent, allowed or disallowed currencies in which payments may be made, various terms and conditions related to handling any disputes that occur, etc. In addition, the illustrated embodiment allows a user to specify a user-defined condition, such as by including executable code and/or a mechanism for invoking an accessible executable function (e.g., a Web service). As an alternative, rather than having different attributes for a type of aspect such as attributes for both allowed and disallowed recipients, a single attribute for recipients could instead be provided, with the type of evaluation criteria instead used to determine whether a user is allowed or disallowed (e.g., by specifying that the recipient "IS" or "IS-NOT" a specified value). In addition, rather than specifying an expiration date and/or use type separate from the other conditions, such information may instead be included among the various conditions that can be specified. Additional details regarding example attributes are discussed elsewhere.

Once the payment instruction set has been defined, user CCC can then use the payment instruction set to authorize payments in various ways. For example, in an embodiment in which the PHS system operates in conjunction with one or more online retailers (e.g., if the PHS system is implemented by a Web store), user CCC can then shop with the online retailer and use the defined payment instruction set as a payment mechanism for one or more items being ordered. FIG. 1H illustrates an example Web page that may be displayed to user CCC in such an embodiment after the payment instruction set has been created (e.g., the Web page may be sent from a server system to a client system in use by user CCC when the client system requests to review detailed information about the item), with this example Web page describing an item available from the online retailer.

In particular, the example Web page contains a summary description section 121 and a detailed description section 127 that each contain various information about the item (in this example, referred to as "Item XYZ"), an introductory section 122 that indicates that the identity of user CCC is known to the online retailer (e.g., based on the user having previously completed a login procedure), sections 123 and 125 for use by user CCC in ordering the item, and gift indication selection option 127. In particular, the shopping cart section 123 allows the user to add the described item to a shopping cart, from which user CCC can later indicate payment and shipping information for the item. The ordering section 125 allows the user to immediately initiate ordering of the described item by selecting the "Buy It Now" control 125a (e.g., with a single click of the mouse button over the displayed indication of the control). When so indicated by user CCC, the item will be ordered using the payment option selected in user-selectable field 125b to provide payment, and by using the shipping option selected in user-selectable field 125e to provide shipping information. In this example, when generating the displayed Web page, the online retailer retrieved indications of the previously defined payment options for user CCC and included them with the page, thus allowing user CCC to select a payment option from the displayed dropdown list that includes options 125c and 125d. As is indicated, the payment instruction set ("PIS") created by user CCC in FIG. 1G is illustrated as option 125c, and is the currently selected value in the field 125b. Thus, after selection of the control 125a with that currently selected value, the online retailer and/or the PHS system will use the information for the indicated payment instruction set to determine whether a payment (not indicated) for ordering Item XYZ is authorized, and if so will collect the payment from user CCC in accordance with the payment instruction set (e.g., by withdrawing the payment from the bank account associated with the payment instruction set).

FIG. 1I illustrates an alternative example in which user CCC uses his/her created payment instruction set to provide payment for a transaction with a different online retailer, who in this embodiment is a retailer that does not have access to information about the payment instruction set created by user CCC. Nonetheless, in this example this online retailer allows users to make payments via the third-party PHS system, such as based on a predefined arrangement with the PHS system or instead by using functionality provided by the PHS system to any third-party online retailer (e.g., via a Web services-based API provided by the PHS system that such third-party online retailers can access to use functionality provided by the PHS system). In particular, in a similar manner to FIG. 1H, FIG. 1I illustrates an example Web page that may be displayed to user CCC to describe an item available from this online retailer (in this example, referred to as "Item WXY"), with this example Web page containing a summary item description section 151, a detailed item description section 157, a shopping cart section 153, and an immediate ordering section 155. In this example, however, an introductory section is not included (e.g., based on this online retailer not knowing the identity of user CCC).

In addition, since this online retailer does not have information about defined payment options available to user CCC, the ordering section 155 in this embodiment does not include a dropdown list with information about such payment options. Instead, the ordering section 155 includes a field 155b in which user CCC can specify a reference corresponding to the PHS payment instruction set created by user CCC in FIG. 1G (e.g., a unique numeric reference for the payment instruction set that was automatically created by the PHS system and provided to user CCC, not shown). The ordering section 155 also includes a "Buy It Now Using A PHS PIS" control 155a that allows the user to immediately initiate ordering of the described item using the PHS payment instruction set specified in field 155b as the payment source for the item ordering. In this example, when user CCC selects the control 155a, the online retailer then supplies the PIS reference to the PHS system along with information about the payment (not shown) for ordering the described item, and optionally supplies various other information regarding the transaction and/or the online retailer. The PHS system uses stored information for the payment instruction set to determine whether the payment for ordering Item WXY is authorized, and if so provides the payment to the online retailer (e.g., by depositing the payment in a PHS system account of the online retailer, such as after deducting a transaction fee charged to the retailer) and collects the payment from user CCC in accordance with the payment instruction set.

While in this embodiment the online retailer obtains the consumer's reference, the functionality provided by the authorization system allows the consumer to protect their confidential information from the retailer and/or other third parties (e.g., hackers and identity thieves) in various ways. In particular, in this example the online retailer or other third party cannot obtain any information from the reference that provides information about the user, the bank account of the consumer that is associated with the reference, or any conditions or other information specified for the instruction set associated with the reference. In addition, the user can define any conditions that are desired to restrict the use of the reference, such as to limit the number of times that the reference can be used (e.g., to as little as a single use), the size of individual payments and/or cumulative payments that the reference can be used to authorize (e.g., to as little as the payment for the current transaction, such as for a dynamically created instruction set and reference), the types of payments or transactions that the reference can be used to authorize (e.g., restrictions on items that can be purchased, such as one or more specific items; restrictions on types of acquisitions of items, such as purchases versus rentals; restrictions on payment recipients, such as for one or more specific retailers; etc.), etc. Moreover, the user and/or authorization system may further provide various functionality to corroborate the identity of a user who attempts to use the reference in various ways, such as for every instruction set and potential payment or transaction, in accordance with instructions specified by a user for his/her instruction set, in a random occasional manner (e.g., to perform spot checks and gather information about attempted fraudulent use), etc. Furthermore, as described elsewhere, in at least some embodiments the authorization system provides various protection against misuse of a user's reference or associated instruction set by others, such as to provide full refunds for a specified period of time (e.g., 30 days).

While not illustrated here, in such embodiments a variety of other types of information and/or selections may be provided, such as to allow user CCC to specify other types of payment options that are not processed via the PHS system (e.g., a credit card), as well as to specify shipping and other types of information. In addition, in other embodiments user CCC may instead be prompted to specify a PHS payment instruction set in other ways, such as if the online retailer initially interacts with the third-party PHS system to obtain at least indications of one or more payment instruction sets of the user (e.g., the user-specified name of the payment instruction set) and to present those indications to the user as payment options (e.g., in a manner similar to that illustrated with respect to the dropdown list 125b of FIG. 1H). As yet another alternative, in some embodiments the online retailer may instead provide functionality to redirect user CCC to a Web page or other interactive functionality provided by the PHS system (e.g., after the user selects control 155a, such as via information included in a hyperlink associated with the control that specifies a Web page provided by the PHS system or that otherwise causes an appropriate API provided by the PHS system to be accessed) in such a manner as to allow the user to provide any user-specific information and/or payment instruction set information directly to the PHS system (e.g., in such a manner as to prevent the online retailer from obtaining that information), and optionally to return the user to interactions with the online retailer after the interactions with the PHS system are completed.

In addition to the illustrated types of use of payment instruction sets by consumers for shopping-related purposes, consumers can similarly use such payment instruction sets for authorizing various other types of payments in other embodiments. In particular, in any situation in which a user may desire to make a financial payment, the user may use information about a payment instruction set (e.g., an associated reference) in conjunction with the PHS system to provide payment as appropriate to an intended recipient, whether by interacting directly with the PHS system or by providing the information about the payment instruction set to the intended recipient for use in interacting with the PHS system. In addition, payment and other usage instruction sets can be used in a variety of manners and by a variety of other types of users and entities in other embodiments. For example, in some embodiments two or more parties to a potential transaction each supply a reference for use in authorizing the potential transaction (or authorizing one or more payments related to the transaction). Those references and various information about the potential transaction can then be supplied to the authorization system for automatic determination of whether the transaction is authorized (e.g., a dynamic determination, such as in a real-time manner) using each of the references. As discussed in greater detail below, in some embodiments the automatic determination by the authorization system of whether a potential transaction is authorized based on the supplied references includes retrieving the instruction sets associated with those references and then determining whether the instruction sets are compatible.

As previously noted, in some embodiments payment and other usage instruction sets are used to authorize programmatic transactions (or payments associated with such transactions), such as transactions involving the use of Web services. For example, a Web service consumer user (e.g., an application developer who would like their application program to be able to invoke Web services under specified circumstances) may define a usage instruction set and make information about the usage instruction set accessible to an executing program so as to allow use of the usage instruction set to authorize Web service-related transactions and/or payments for such transactions. Similarly, a potential Web service provider may specify rules for a usage instruction set that limits the liability to the Web service provider for the transactions that can be authorized by that usage instruction set (e.g., limitations on consumers that can purchase access to a Web service provided by the Web service provider, limitations on types of payment that can be used to purchase access to the Web service, limitations on remedies available to consumers that are unhappy with their use of the Web service, etc.). In addition, a potential Web service caller (e.g., an end user of an application program supplied by an application developer that invokes one or more Web services) may specify rules for a usage instruction set that limits the liability to the caller for the transactions that can be authorized by that usage instruction set (e.g., limitations on types of programmatic transactions that the caller is authorized to initiate and/or on types of payments that can be made to purchase access to a programmatic service, such as payments to providers of the services and/or fees paid to a transaction authorization service and/or other third-party service such as a payment service).

Figure 8A:
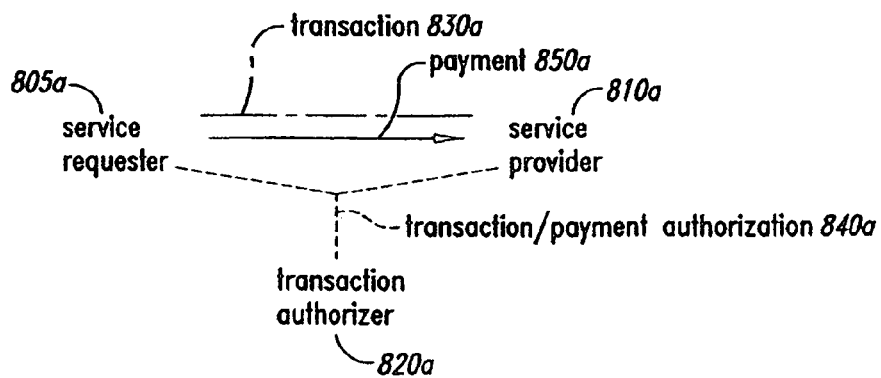
Figure 8B:
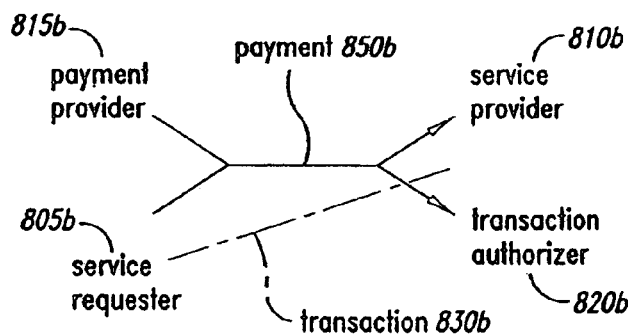
Figure 8C:
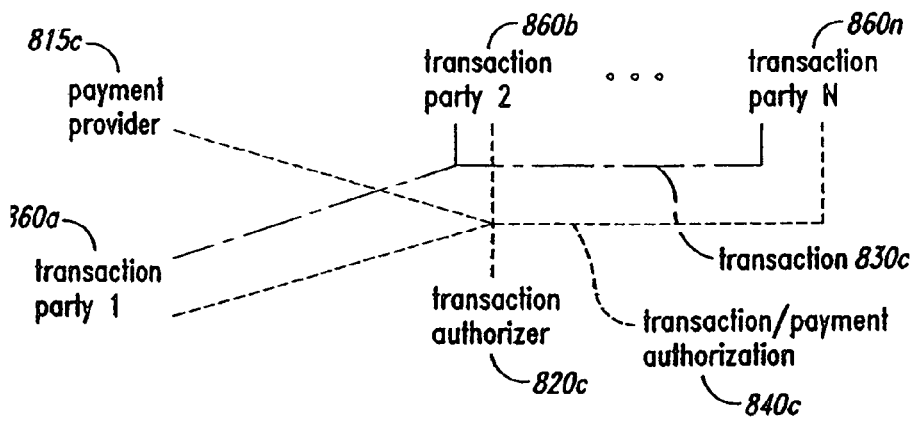

Thus, the PHS system or other transaction authorization system may be used to authorize payments and/or transactions for a variety of types of interactions between parties, with FIGS. 8A-8C illustrating examples of some such interactions. In particular, FIG. 8A illustrates an example of a 2-party transaction 830a in which a party 805a requests a service to be provided by a party 810a, with the providing of the service having an associated cost. A transaction authorization system 820a uses information about the parties 805a and 810a (e.g., information received from one of the parties who makes a programmatic call to the transaction authorization system requesting the authorization) in order to determine whether to authorize the transaction and/or the providing of a payment 850a from the service requester to the service provider to cover the cost associated with the transaction. After the transaction and/or payment are authorized, the transaction authorization system provides an indication of the authorization (e.g., as a response to the authorization request call), and may further in some embodiments actually make the authorized payment on behalf of the service requester. Details regarding how the authorization process 840a may occur are discussed in greater detail below.

The illustrated authorization and payment techniques can be used in a variety of situations. For example, the provided service may involve a programmatic transaction between the two parties (e.g., invocation by the service requester party of a Web service provided by the service provider party), or instead could involve other types of transactions (e.g., a physical transaction between the parties, such as providing a physical product or service from one party to the other). The authorization interactions with the transaction authorization system can similarly be performed in various ways, such as during the transaction (e.g., such that the transaction will not be completed unless an appropriate authorization response is received), or instead in a manner separate from the transaction (e.g., after the transaction is completed in order to provide payment to the service provider). In addition, the information regarding the parties that is used in performing the authorization may similarly have a variety of forms, as discussed in greater detail below.

FIG. 8B provides an example of a more complex payment 850b for a transaction 830b in which a party 805b requests a service to be provided by a party 810b. In this example, after the transaction authorization system 820b authorizes the transaction (not shown), portions of the payment may be provided to both the service provider 810b and the transaction authorization system (e.g., based on the transaction authorization system charging a fee for performing the authorizing of the transaction and/or payment), and portions of the payment may be provided by both the service requester and one or more other payment providers 815b (e.g., an application developer that provided an application program being executed by the service requester). In other situations, payments between the various parties could be provided in other ways, such as if the payment provider(s) provide all of the payment, if the payment provider(s) provide the portion of the payment going to one of the service provider and the transaction authorizer and the service requester provides the portion going to the other of the service provider and the transaction authorizer, etc.

FIG. 8C provides an example of a more complex transaction 830c having multiple participating parties 860a-860n. In this example, some or all of those parties, as well as one or more other payment providers 815c, may provide information to or otherwise interact with the transaction authorization system 820c to allow the transaction authorization system to determine whether the transaction and/or any associated financial payment is authorized. After the authorization process 840c provides approval, payments (not shown) may be made by one or more of the participating parties and/or the payment provider(s) to other of the participating parties and/or the transaction authorizer.

The information about a potential payment and/or potential transaction that is supplied to the transaction authorization system may vary in various embodiments and situations. For example, the information may in some situations be limited to merely a payment amount to be paid by one of the parties to another of the parties, while in other situations a variety of additional details about a related transaction may be supplied (e.g., a type of the transaction). Furthermore, in some situations the call to the transaction authorization system can further specify details about what (if any) each of the two or more parties is to pay, whether to another party and/or as fees to the transaction authorization system.

As previously noted, in at least some embodiments in which multiple payment instruction sets or other usage instruction sets are supplied for use in authorizing a potential payment and/or a potential transaction (e.g., a single instruction set from each of multiple parties, or multiple instructions sets from a single party), the determining of whether to authorize the payment and/or transaction based on the usage instruction sets includes determining whether the instruction sets are compatible. This determining can be performed in various ways in various embodiments, such as by determining if each rule or other condition in each instruction set is satisfied for the current potential payment and/or transaction. Such satisfaction can occur in various ways for different types of conditions, such as based on information about the potential payment and/or transaction (e.g., a type of transaction and/or a specific payment amount), information about one or more other parties to the transaction (e.g., whether the parties satisfy specified criteria), information about one or more other instruction sets specified for the potential transaction (e.g., whether one or more corresponding conditions in the other instruction rule set(s) match or are otherwise compatible with the condition), etc. Conversely, in some situations instruction sets may be determined not to be compatible because one or more of them (and their associated references) are invalid for a current potential payment and/or transaction based on current circumstances and/or circumstances at the time of the potential transaction, such as if the instruction set is not currently available for use (e.g., it has expired or is otherwise not currently available for use, such as based on a total number of allowable uses or total allowable payment amount having been exceeded) and/or if it cannot be used for the potential transaction.

When a financial payment is automatically determined to be authorized, the authorization system may in some embodiments further perform or facilitate the payment exchange between the parties as appropriate. For example, in some embodiments a payment-providing user may have previously specified one or more payment instruments (e.g., a credit card, bank account, etc.), and if so a financial payment may be obtained from one or more of those payment instruments in an appropriate manner (e.g., from a payment instrument specified by a payment instruction set for the payment-providing user). Similarly, a payment-receiving user may have previously specified one or more payment repositories (e.g., a bank account, debit card, etc.), and if so a financial payment may be provided to one or more of those payment repositories in an appropriate manner (e.g., to a payment repository specified by a payment instruction set for the payment-receiving user).

After the transaction authorization system authorizes a potential transaction (and optionally performs any associated financial payments for the potential transaction), the parties to the transaction can then perform the transaction in an appropriate manner. For example, when the transaction is a fee-based Web service transaction, the Web service consumer can invoke the Web service and the provider of the Web service can provide the associated functionality for the Web service to the consumer. Alternatively, in some embodiments the authorization of such a potential payment and/or potential transaction may occur at other times, such as after the payment and/or transaction have occurred, or in advance of the potential payment and/or potential transaction (e.g., to pre-authorize the payment or transaction).

In some embodiments, additional restrictions may be imposed by the transaction authorization system even after a potential transaction is authorized and/or performed. For example, in some situations recipients of payments may not be allowed to immediately withdraw or receive those payments, such as by limiting access to an account of the transaction authorization system in which the payment has been deposited and/or by delaying deposit of some or all of a received payment into another payment repository for the recipient. Such payment access restrictions may be performed for various reasons and in various ways, including to allow any disputes to be resolved and any refunds to be automatically made (e.g., as a chargeback to the payment recipient for the amount of the refund) during a specified period of time after the transaction is authorized and/or performed. More generally, in at least some embodiments the one or more sets of private authorization instructions used to authorize a financial payment for a transaction may further specify one or more conditions related to handling disputes, and if so the transaction authorization system may enforce any such dispute-related conditions when resolving disputes, such as if the specified conditions were used to form a binding agreement between the parties to the transaction. In addition, in some embodiments additional related functionality may further be provided by the transaction authorization system or from a third-party, such as a fee-based underwriting or insurance service that guarantees or provides the funds for any such refunds, thus allowing a payment recipient to have immediate or more rapid access to any received payments.

In some embodiments, users of the transaction authorization system may more generally define other types of usage instruction sets for use in situations other than authorizing fee-based transactions and other payments, whether instead of or in addition to payment instruction sets. For example, such usage instruction sets can each include one or more specified rules or other conditions that regulate the circumstances under which the usage instruction set can authorize a potential transaction that does not include a fee, such as to determine whether to provide access to restricted information or a restricted service.

In addition, the rules and other conditions in usage instruction sets can be specified and used in various ways in various embodiments, and further can have a variety of forms in various embodiments. For example, in some embodiments a rule or other condition may specify a type of information to examine, a type of evaluation to perform with respect to that information, and a test for determining whether the results of the evaluation satisfy the condition. More generally, in other embodiments a rule or condition may reflect any circumstance or information that can be examined and/or evaluated to determine whether it is satisfied in a specified situation. For example, in some embodiments a rule or other condition can be specified using XML format, and the instruction sets can further in some embodiments be specified and/or stored as XML documents.

Furthermore, in some embodiments users may select from a variety of predefined types of rules or other conditions when creating usage instruction sets, such as with each predefined type specifying a type of condition related to use of an instruction set and with each user selection including specifying one or more parameter values to customize the predefined type so as to affect how or when the specific usage condition is satisfied for the instruction set being created. In addition, in some embodiments users may specify various user-specific rules or conditions, such as conditions that each indicate a user-specified procedure for determining when a condition is satisfied (e.g., by providing executable code for the condition that when invoked provides an indication as to whether the condition is satisfied, or instead by indicating a way to automatically obtain a response indicating whether the condition is satisfied, such as by invoking an accessible user-specified Web service or other function using specified parameter values).

In some embodiments, an evaluation of a rule or other condition may further involve obtaining additional information to be used as part of the determination as to whether the condition is satisfied, such as in an automated manner and/or in an interactive manner with respect to one or more users (e.g., by querying the user that created the instruction set to confirm an evaluation and/or to provide additional information). Moreover, in some embodiments in which functionality related to security and/or privacy for a usage instruction set is provided, one or more of the rules or other conditions in the instruction set may be used to provide that functionality (e.g., by restricting who can access and/or modify the instruction set), while in other embodiments such functionality may be provided in other manners (e.g., by controlling access to a user account with which one or more instruction sets can be associated).

In addition, payment/usage instruction sets and their rules/ conditions can be created in various ways in various embodiments, such as interactively via a GUI provided by the transaction authorization system and/or via invocation of one or more Web services provided by the transaction authorization system for that purpose. Such Web services may be implemented in various ways, such as using APIs based on XML over HTTP (e.g., as part of the REpresentational State Transfer, or "REST", distributed interaction model that focuses on resources) and/or on the use of SOAP and/or other protocols related to Web services. Furthermore, after an instruction set has been created and associated with a reference (e.g., a reference token), the instruction set may in some embodiments not be allowed to be modified. Alternatively, in some embodiments such an instruction set may be modified, and a new reference for the modified instruction set will be generated for the new instruction set (e.g., to replace the prior reference). Moreover, in some embodiments references and/ or associated instruction sets may be dynamically created at the time of intended use (e.g., as part of or just prior to a customer engaging in an interactive commerce-related transaction, to attempting to invoke a programmatic service and/or to sending an authorization request to a third-party authorizer)—as one example, one-time or single-use references and/or instruction sets may be created and used (e.g., for a specific potential payment and/or potential transaction) in some embodiments.

Furthermore, in some embodiments in which fee-based transactions are authorized and financial payments are handled, some or all of the users may further have an account with the transaction authorization system that facilitates such payments, such as an account that can be used by a user as a payment instrument and/or a payment repository. Such accounts and/or other financial instruments/repositories may in some embodiments support micro-payments of very small amounts. In addition, in some embodiments the transaction authorization system may further provide aggregation of financial payments to be provided and/or received (e.g., on a periodic basis, such as a month), such as to minimize fees associated with financial payment transactions and/or to allow minimum payment amounts to be reached. As with other types of accounts, such user accounts may in some embodiments have various conditions and restrictions related to their use, such as a maximum allowed credit balance, as well as various security and access control (e.g., password-based).

In addition, while the transaction authorization system has been described above as providing a variety of functionality and capabilities in various embodiments, in some embodiments some of such functionality and capabilities may instead be split across one or more systems. For example, in some embodiments some or all users may already have user accounts with another system with which the transaction authorization system is affiliated or to which the transaction authorization system otherwise has access, and if so some or all of the account-related functionality may be provided by that other system in conjunction with the transaction authorization system (e.g., the storing of instruction sets, the generating of references, the providing of payment repository/ instrument functionality, etc.).

For illustrative purposes, some embodiments of the software facility are described below in which various specific types of capabilities and functionalities are performed by a specific embodiment of a transaction authorization system, and in which users define and use specific types of instruction sets in specific ways, such as payment instruction sets to authorize various types of fee-based programmatic transactions and other types of payments, and such as by representing specified conditions for instruction sets in a rule format. However, those skilled in the art will appreciate that the techniques of the invention can be used in a wide variety of other situations, including with services and items other than Web services and for purposes other than providing financial payment, and that the invention is not limited to the exemplary details provided.

Figure 2:
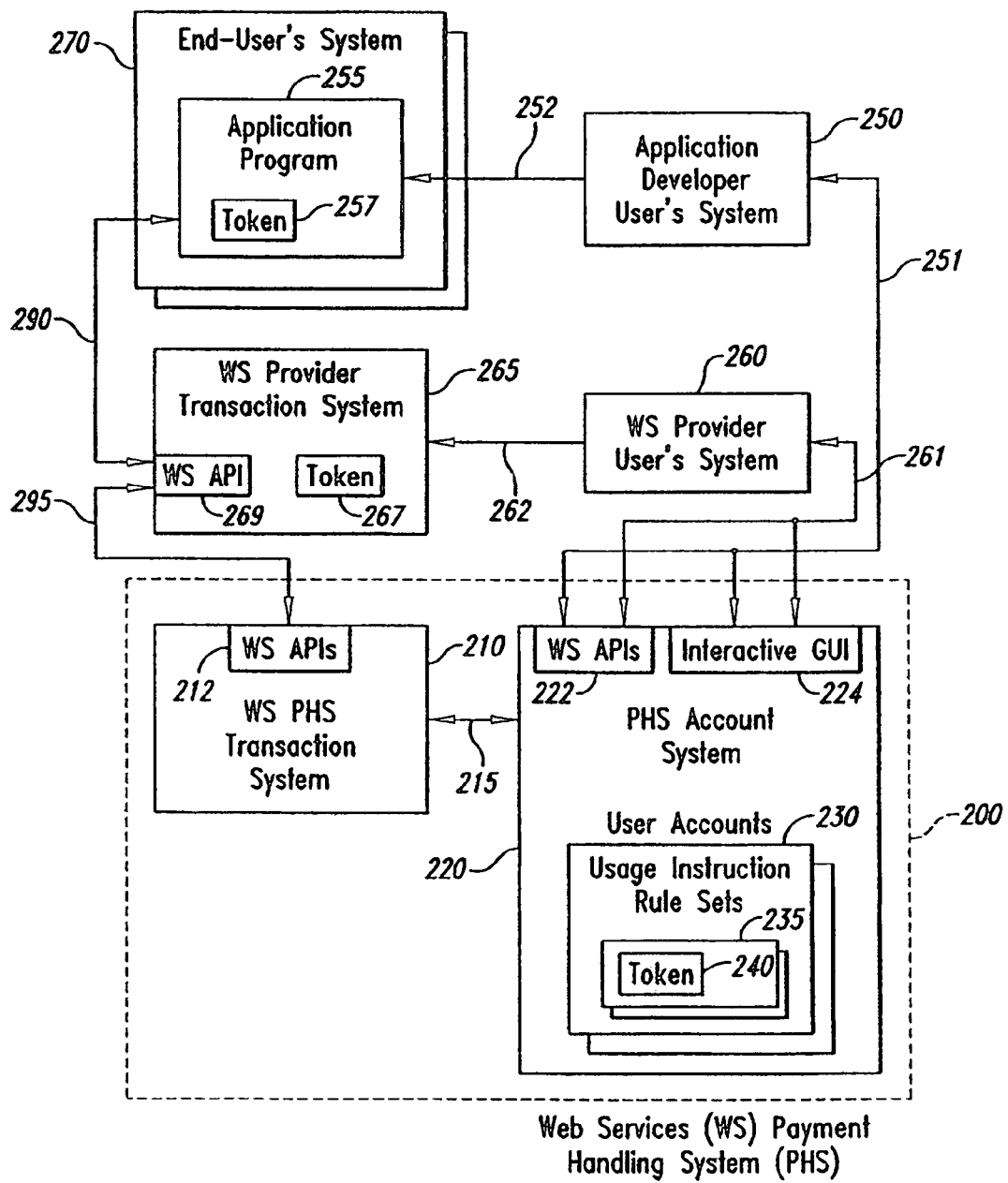
FIG. 2 is a network diagram illustrating components and information flow of an example embodiment of a Web services Payment Handling System.

FIG. 2 is a network diagram illustrating components and information flow of an example embodiment of a Payment Handling System ("PHS") financial transaction authorization system 200 for use in authorizing transactions involving Web services ("WS"). Various users and systems interact with the PHS in the illustrated example to receive payment-handling functionality, such as for transactions that occur between the users and/or systems. In the illustrated embodiment, the PHS includes both an Account System 220 and a Web services Transaction System 210, as discussed below.

In particular, in the illustrated embodiment a user (not shown) performing application development uses a computing system 250 to interact 251 with the PHS to enable later payment handling functionality on behalf of the application programs developed by the user. The application developer user's computing system 250 first interacts with the Account System to define a user account 230 for the application developer, such as via an interactive GUI 224 provided by the Account System or instead via one or more Web services APIs 222 provided by the Account System. In the illustrated embodiment, each such user account may include one or more usage instruction rule sets 235 that each specify various rules regarding how and when the usage instruction rule set can be used for payment purposes. In addition, each usage instruction rule set has an associated unique reference token 240 for later referencing of that usage instruction rule set. After the application developer user creates the account with one or more usage instruction rule sets, the user then includes one or more of the reference tokens 257 for the usage instruction rule sets within one or more application programs 255 that they create.

Similarly, one or more users (not shown) that provide Web services to others use a computing system 260 to interact 261 with the Account System via the interactive GUI and/or Web services APIs of the Account System. As with the application developer, each Web services provider user can create an account with one or more usage instruction rule sets with the Account System. The Web services provider user can then associate one or more of their reference tokens 267 for their usage instruction rule sets as part of one or more Web services Provider Transaction Systems 265 with which the Web services provider provides Web services to others (e.g., for a fee).

When one of the application programs 255 is later being executed by an end user (not shown) on an end-user computing system 270, the application program invokes 290 one or more Web services provided by the Web services Provider's Transaction System, such as via a Web services API 269. However, the Web services provider in the illustrated embodiment will provide the requested Web service only if appropriate payment is provided for the application program. Thus, in the illustrated embodiment, the application program supplies a reference token 257 of the application developer user as part of the Web service invocation. Before providing the requested Web service to the application program, the Web services Provider Transaction System then contacts 295 the PHS Transaction System 210 to obtain appropriate authorization and payment, such as via invocation of a Web services API 212 of the PHS Transaction System. In the illustrated embodiment, the Web services Provider Transaction System provides the reference token 267 for the Web services Provider as well as the reference token 257 from the application program as part of the interaction with the PHS Transaction System, and further provides information about the transaction and associated payment that is to occur. While not illustrated here, in some embodiments the one or more Web services provided by the Web services Provider's Transaction System 265 and the reference token 267 may be part of one or more application programs of the Web services provider, such as application programs provided as part of a Web site (not shown) of the Web services provider.

The PHS Transaction System 210 determines if the payment transaction is approved in the illustrated embodiment by first interacting with the Account System 220 to retrieve information about the usage instruction rule sets 235 corresponding to the reference tokens provided in the call to the Web service API 212, as well as further retrieving other information from the user accounts 230 to which those usage instruction rule sets belong. After obtaining the usage instruction rule sets and other information, the PHS Transaction System 210 then determines whether the rule sets are compatible and otherwise authorize the requested payment to be made, and if so the PHS Transaction System performs the payment (e.g., by charging a payment instrument associated with the application program's reference token 257 and by depositing at least some of that charge in a payment repository associated with the Transaction System 265's reference token 267) and provides confirmation to the Transaction System 265, with the Transaction System 265 subsequently providing the initially requested Web service to the application program. In some embodiments, the PHS may further obtain payment for some or all of the services it provides, such as a portion of the payment for each transaction performed and/or a payment associated with account creation and/or modification.

Although the PHS Transaction System 210 and Account System 220 are illustrated in this embodiment as being separate but cooperating systems, in other embodiments the illustrated functionality can be provided in other ways. For example, in some embodiments a single system may provide the account creation and maintenance capability as well as the transaction authorization and handling capability, while in other embodiments the Transaction System 210 and Account System 220 may instead be provided by unrelated systems/organizations.

In addition, while only payment-type transactions are illustrated here, in other embodiments a variety of other types of transactions could be performed, whether instead of or in addition to a payment transaction. Moreover, while the illustrated embodiment discusses a per-use fee for using the Web service of the Transaction System 265, in other embodiments a variety of other types of purchase transactions could be performed, such as an ongoing subscription to one or more Web services of the Transaction System 265 for one or more application programs 255. Alternatively, a specified number of uses of the Web service or an unlimited number of uses during a specified period of time may instead be purchased and associated with the reference token 257, such as by the application developer user before distributing the application program 255 to the end users. In such situations, information about the subscription or other multi-use purchase may be stored by the Account System in various ways so that the Transaction System 210 will later be able to determine that a payment transaction is authorized. Additional details regarding automatically authorizing programmatic transactions using usage instruction rule sets are included in related U.S. patent application Ser. No. 10/894,347, filed Jul. 19, 2004 and entitled "Automatic Authorization Of Programmatic Transactions", which is hereby incorporated by reference in its entirety.

Figure 9A:
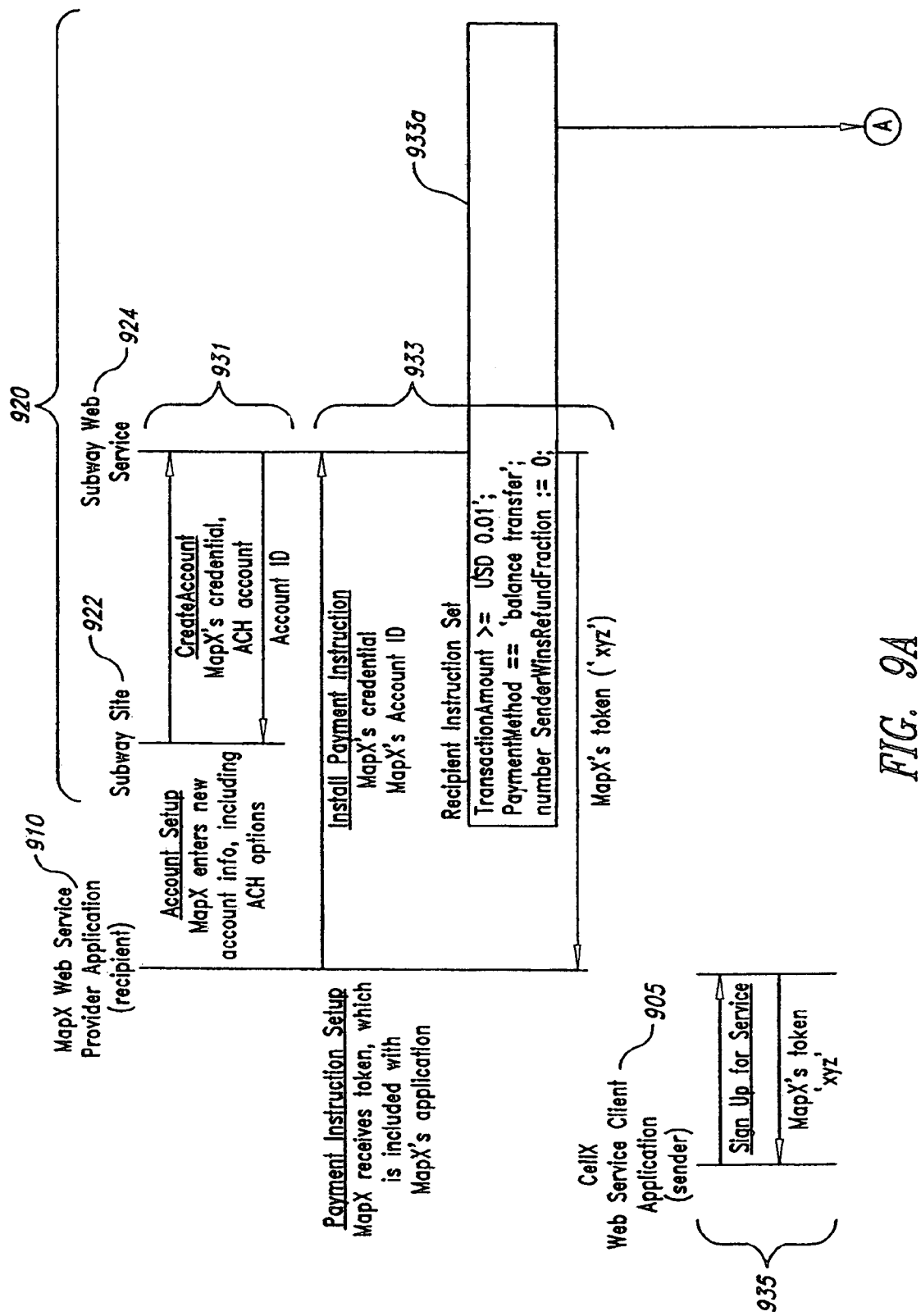

FIGS. 9A-9B and 10A-10C each illustrate an additional example of performing programmatic transactions that are automatically authorized by a third-party transaction authorization system (referred to as "Subway" for purposes of these examples). In particular, FIGS. 9A and 9B illustrate an example of making machine-to-machine micropayments for Web service-based programmatic transactions. In this example, a Web service provider referred to as "MapX" provides a Web service that serves maps by address for a fee of 1 cent per invocation or call. "CellX" is a potential Web service consumer of this Web service as part of a cellphone (or "mobile phone") service provided to various end-user customers. After CellX signs up for MapX's programmatic mapping service, CellX uses this MapX service to make maps available to its cellphone service customers.

The illustrated series of actions for the example in FIGS. 9A and 9B begins with a representative of MapX (not shown) performing interactive account setup actions 931 with the Subway transaction authorization system 920, and in particular using a Web site 922 provided by the Subway system 920 to specify information about MapX (e.g., credential information and Automated Clearing House (or "ACH") bank information for MapX). The Subway Web site 922 then interacts with a Subway Web service 924 to create an account for MapX by supplying the received information for MapX and by receiving an ID for the new account in response. A representative of MapX then initiates programmatic interactions 933 with a Subway Web service 924 to create a payment instruction rule set for MapX by supplying MapX's credentials, account ID and the rules 933a for the payment instruction rule set—such programmatic interactions by the MapX representative may include using a MapX Web service provider application 910 that will later provide the mapping Web service to consumers or, instead, using another program (not shown). The Subway system 920 stores 926a the payment instruction rule set in storage 926 and returns an associated token to the MapX representative, and the MapX representative includes the token with the MapX Web service provider application 910 for later use in authorizing transactions. After registering the payment instruction rule set, MapX is now able to use the MapX application 910 to offer its mapping Web service to potential consumers of the Web service.

A representative of CellX (not shown) then interacts 935 with the MapX application 910 to sign up for the MapX mapping service (e.g., by using an appropriate Web service of the MapX application 910 to perform the signup activities), and receives MapX's token in response. The CellX representative also performs account setup actions 937 with the Subway system 920 by interacting with the Subway Web site 922 to specify information about CellX, and receives an account ID in response. To obtain the account ID, the Subway Web site 922 interacts with a Subway Web service 924 to create the CellX account by supplying the information received from CellX. The CellX representative then initiates programmatic interactions 939 with a Subway Web service 924 to create a payment instruction rule set for CellX by supplying CellX's credentials, account ID and the rules 939a for the payment instruction rule set. The Subway system 920 then stores 926a the payment instruction rule set in storage 926 and returns an associated token to the CellX representative, and the CellX representative includes the token with a CellX application 905 that is available to CellX customers via the cellphone service from CellX. After registering the payment instruction rule set, CellX is now able to offer MapX's mapping Web service to its customers via the CellX application 905.

A customer of the CellX cellphone service then selects 941 functionality in the CellX application 905 that uses MapX's mapping functionality from the MapX application 910, such as by selecting a map-related link that is part of an online directory service of the CellX application 905. The user selection then causes the CellX application 905 to programmatically invoke a MapX Web service from the MapX application 910 in order to request a particular map corresponding to the customer's selection, with the invocation including supplying the CellX reference token previously associated with the CellX application 905. The MapX application 910 then submits to a Subway Web service 924 a pay authorization request that includes information about the transaction, MapX's credential, and the MapX and CellX reference tokens. The Subway system 920 then retrieves 926b the payment instruction rules sets for the reference tokens and uses them to determine that the transaction is authorized, performs the payment from CellX to MapX for the invocation, and returns a transaction ID to the MapX application 910 indicating the transaction authorization. The MapX application 910 then supplies the requested map to the CellX application 905, which displays the map to the customer. As one example of a possible implementation for the MapX application 910 and the CellX application 905, the CellX application 905 may operate in a manner similar to application program 255 previously described in FIG. 2, and the MapX application 910 may operate in a manner similar to an application program of the WS Provider Transaction System 265 that includes the WS API 269, as previously described in FIG. 2.

Figure 10A:
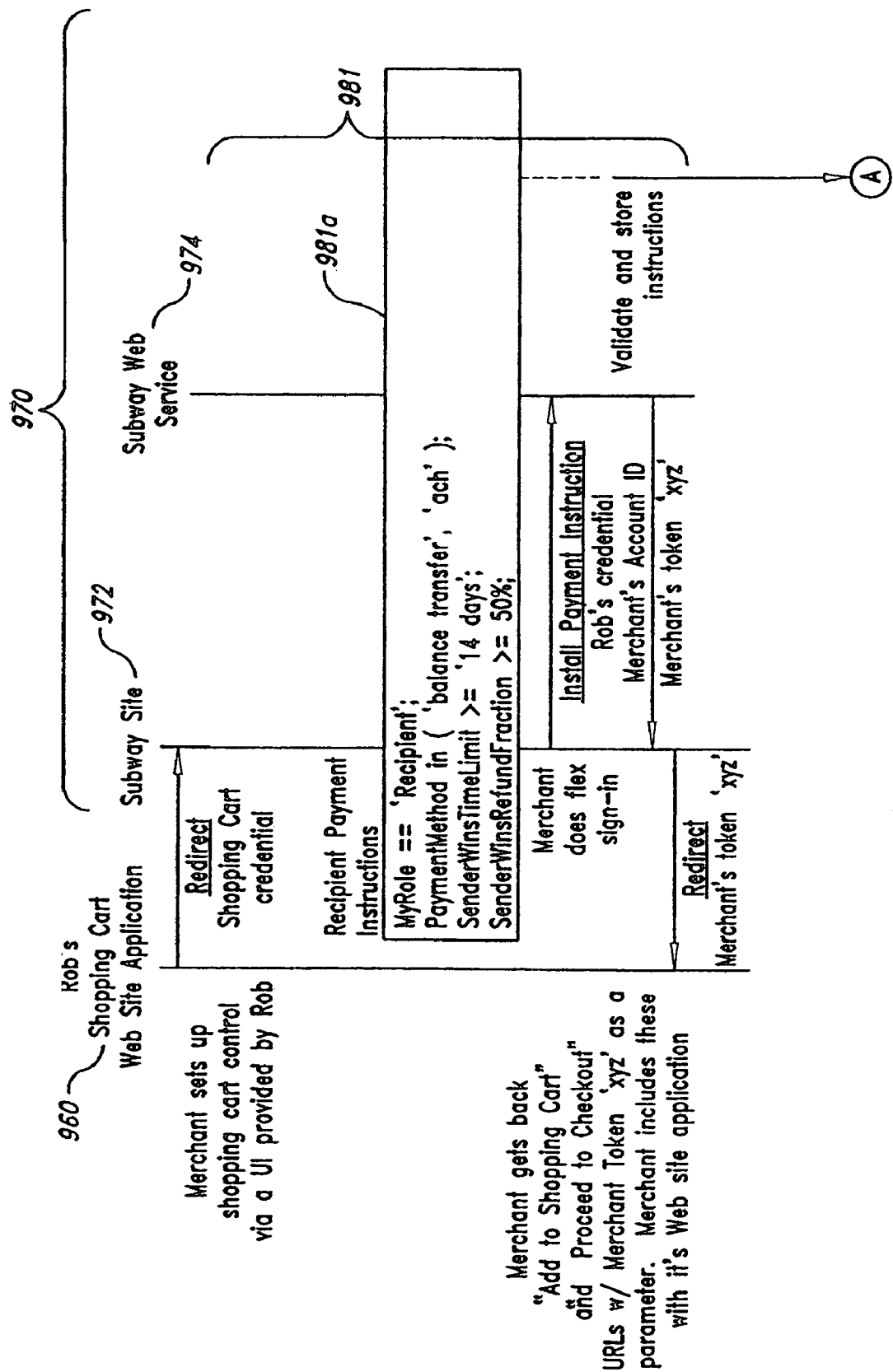
Figure 10B:
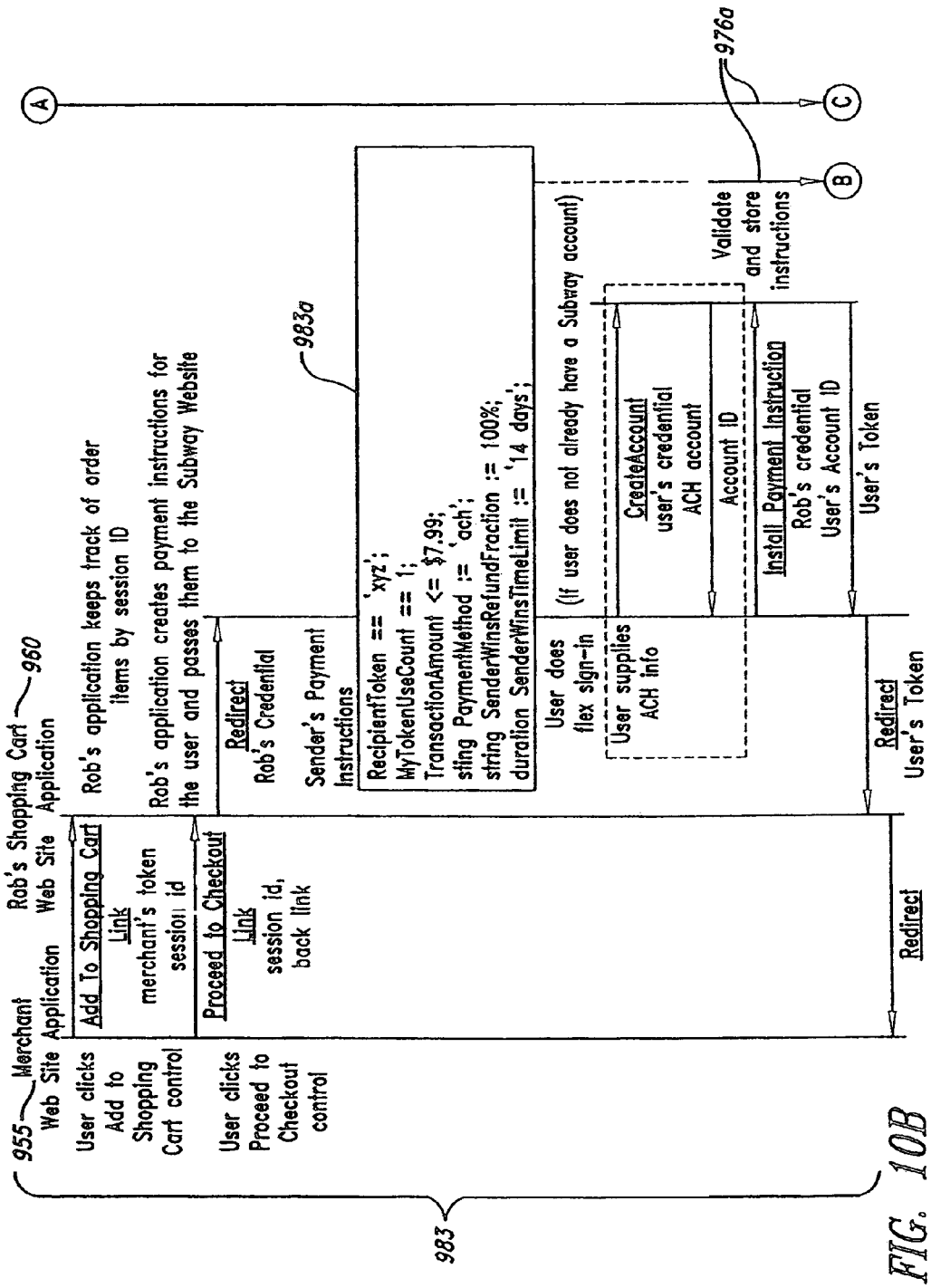
Figure 10C:
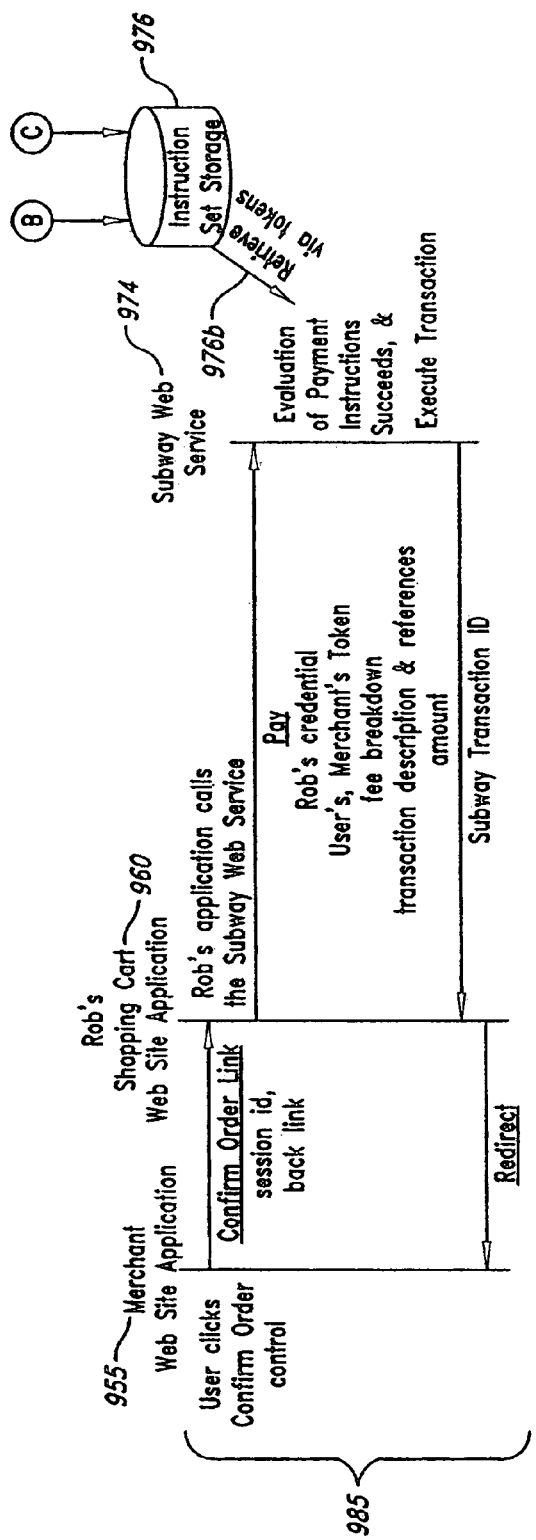

FIGS. 10A-10C illustrate another example of using payment instruction rule sets to authorize programmatic transactions, which in this example includes a user (named "Rob") who provides an application 960 to implement shopping cart functionality for third-party merchants via Web services. Such merchants can sign up for and use Rob's shopping cart functionality by including customer-selectable controls in the merchants' applications that interface with Rob's shopping cart application 960, which in turn maintains session information for each customer of each merchant. When customers check out via a merchant's application, Rob's shopping cart application 960 interacts with the Subway transaction authorization system 970 to process payments from the customers to the merchants.

The illustrated series of actions for the example in FIGS. 10A-10C begins with a representative of a merchant (not shown) performing interactive actions 981 to sign up for Rob's shopping cart service by interacting with Rob's shopping cart application 960, which first redirects the representative to the Subway transaction authorization system 970 to register a payment instruction rule set for the merchant. The merchant representative next interacts with a Web site 972 provided by the Subway system 970 to sign in (in this example the merchant already has an account with the Subway system 970) and to supply payment instruction rule information 981a to the Subway system 970. The Subway Web site 972 then interacts with a Subway Web service 974 to create a payment instruction rule set by supplying credentials for Rob's shopping cart Web site application 960, an account ID for the merchant, and the rules 981a for the payment instruction rule set. The Subway system 970 next stores 976a the payment instruction rule set in storage 976 and returns an associated token to the merchant via Rob's shopping cart Web site application 960. The merchant then includes customer-selectable controls related to shopping cart functionality as part of the merchant's Web site application 955, with the controls associated with appropriate URLs that use the merchant reference token as a parameter while invoking corresponding Web services provided by Rob's shopping cart Web site application 960.

A customer of the merchant then interacts 983 with the merchant's Web site application 955 to select an appropriate control to add an item to the customer's shopping cart, which causes information to be sent from the merchant application 955 to Rob's shopping cart Web site application 960 that includes a session ID for the customer and the reference token for the merchant. When the customer later indicates via the merchant Web site application 955 to proceed to checkout, the merchant application 955 sends information to Rob's shopping cart application 960, which in turn interacts with the Subway Web site 972 in order to dynamically specify a one-time set of payment instruction rules for the customer for the amount corresponding to purchasing the items in the customer's shopping cart. The customer is also prompted to sign in at the Subway Web site 972, including creating an account if need be. The Subway Web site 972 then proceeds to interact with a Subway Web service 974 to create the payment instruction rule set by supplying credentials for Rob's shopping cart Web site application 960, an account ID for the customer, and the rules 983a for the payment instruction rule set. The Subway system 970 next stores 976a the payment instruction rule set in storage 976 and returns an associated token for the customer to Rob's shopping cart Web site application 960.

When the customer of the merchant indicates placing an order by selecting a "Confirm Order" control via the merchant Web site application 955, the merchant application 955 sends an indication to Rob's shopping cart Web site application 960 that includes the session ID. Rob's shopping cart Web site application 960 then retrieves the reference token for the customer that was previously created, and submits a pay authorization request to a Subway Web service 974 that includes information about the transaction, the shopping cart Web site credential, and the reference tokens for the merchant and customer. The Subway system 970 next retrieves 976b the payment instruction rules sets for the reference tokens and uses them to determine that the transaction is authorized, performs the payment from the customer to the merchant for the transaction, and returns a transaction ID to Rob's shopping cart Web site application 960 indicating the transaction authorization.

In a similar manner to FIGS. 1F-1G, FIGS. 1A-1B provide examples of interactions by users to create accounts and usage instruction rule sets for later use by a transaction authorization and handling system. In particular, FIG. 1A provides an example of a GUI via which a Web service provider user ABC interactively creates a user account, such as by filling in forms in a Web page provided by an Account System. In this illustrated example, the example interactive creation screen includes a heading area 111 with overview information, followed by an area 113 in which the user can specify various general information for the account, such as an account name, a password for access control to view and modify the account, any optional certifications, and any optional organization affiliations. In this example, user ABC specifies a certification from a third-party company BCD Corporation, as some usage instruction rule sets of potential consumers of the Web services provided by ABC may request such a certification in order to authorize payment to ABC. Similarly, user ABC indicates organization affiliations both to its own company and to an association of various Web service providers, as usage instruction rule sets of potential consumers of ABC's Web services may similarly request one or more such organization affiliations to authorize payment to user ABC.

In this example, the account creation screen also includes an optional section 114 in which the user ABC can specify one or more payment repositories for payments that the user may receive, such as for providing fee-based Web services to consumers. In this example embodiment, user ABC specifies two payment repositories in which incoming payments may be deposited, including a bank account and a debit card. The user further specifies restrictions for the debit card such that any payments deposited must be a minimum of at least five cents. The section 114 in this illustrated embodiment also indicates that the user account being created can itself serve as a payment repository for the user.

The account creation screen also includes a section 115 in which the user ABC can specify one or more payment instruments to be used for payments to be made to others. In this example, user ABC specifies the same bank account as an available payment instrument, although with a restriction that any individual payments from the account be no larger than $50, as well as a credit card payment instrument with restrictions of maximum individual payments of $200 and a maximum cumulative balance of $2,000. Section 115 similarly indicates that the user account being created can be used as a payment instrument by the user, which for this user and in this example includes a $1,000 maximum balance credit limit. After specifying the various types of information, the user can then select the control 116b to create the account, or the user can instead select the control 116a to cancel the account creation.

In the illustrated embodiment, after initially creating the user account, the user is then presented with the option of creating one or more usage instruction rule sets via the example screen shown in FIG. 1B. In particular, the illustrated screen includes a header section 117 with overview information and a rule specification section 118 in which various information can be specified for a usage instruction rule set being created. In this example, section 118 allows the user to specify a name for the usage instruction rule set being created, a usage type for the rule set (which in this example is to receive payments), a payment repository to receive any such payments, and an expiration date which in this example is not specified. The user ABC can also specify one or more specific rules for this rule set. The example illustrates two rules that have been defined, and a drop-down menu for a third rule showing other types of rule attributes that can be selected and customized for this usage instruction rule set in this example.

For example, user ABC has specified that this usage instruction rule set will only receive payments from users that satisfy the first "AllowedPayers" role attribute, which in this example can be satisfied based on a specified organization affiliation of the payer, rating of the payer, or specific payer whose ID is indicated. As is indicated, other rule attributes that can be specified in this example include disallowed or blocked payers from whom user ABC will not accept payment, specifications of allowed or disallowed transaction types with which the usage instruction rule set can be used, allowed or disallowed types of payment instruments and currencies for received payments, terms and conditions for later handling any disputes that occur, etc. In addition, the illustrated embodiment allows a user to specify a user-defined rule, such as by including executable code and/or a mechanism for invoking an accessible executable function (e.g., a Web service). After specifying the various information for the usage instruction rule set being created, the user ABC can then select one of the controls in section 109 to create the current usage instruction rule set and continue with creating another rule set for the account, to create the current usage instruction rule set and exit the account modification, or to skip the creation of a current instruction rule set and exit.

The types of rule attributes shown in this example are provided in a simplified manner for the purpose of example, and similar information could instead be specified in other ways in other situations. For example, rather than having different attributes for allowed and disallowed payers, a single attribute for payers could instead be provided, with the type of evaluation criteria instead used to determine whether a user is allowed or disallowed (e.g., to satisfy the rule, it is specified that the payer "IS" or "IS-NOT" a specified value). Additional details regarding example attributes are discussed elsewhere.

FIG. 1C illustrates an alternative technique for creating usage instruction rule sets for a user account. In particular, in this example embodiment, user accounts and usage instruction rule sets are created programmatically by a Web services consumer application developer user CDE, such as via one or more Web services provided by the WS Payment Handler System. In this example embodiment, the information supplied as part of the programmatic invocation includes the example XML document 131 illustrated in FIG. 1C. This example XML document specifies the account ID with which the usage instruction rule set being created will be associated (e.g., an account ID received by the user in response to an earlier programmatic invocation to create the user account), and further provides a variety of information similar to that specified in an interactive manner with respect to FIG. 1B.

In particular, this usage instruction rule set is being created by user CDE for use in providing payment for transactions that will be invoked by one or more application programs created by user CDE, such as fee-based Web services (e.g., one or more Web services provided by Web service provider user ABC). In this example, the usage instruction rule set being created will use user CDE's PHS account (designated in this example with the name "MyPHSAccount"), and has a specified expiration date. The second of the two rules defined for the usage instruction rule set further limits the total payments that this usage instruction rule set can authorize to be less than or equal to the amount of $1,000 by using the predefined rule attribute "PaymentsAllowed" with an appropriate evaluation type and rule value. The first rule specified for the usage instruction rule set identifies a specific payment recipient with which the usage instruction rule set cannot be used, which in this example is specified with a general attribute of "Recipient" and appropriate evaluation type of "IS-NOT" rather than a more specific attribute type of "DisallowedRecipient". In other embodiments, corresponding information could be instead provided in a variety of other ways, including in XML documents using other formats and/or in ways other than with XML.

FIG. 1C also illustrates a second XML document 133 for creating another usage instruction rule set for user CDE's account, such as to accompany a second programmatic invocation to the WS Payment Handler System. In particular, this second usage instruction rule set illustrates an example of a usage instruction rule set for transactions of a type other than payment handling, such as to specify access control information in this example. For example, user CDE may have a subscription or other membership that provides access to one or more programmatic services or sources of information, but user CDE may wish to limit when such access rights are made available to one or more applications provided by the user. In this example, the usage instruction rule set being created in XML document 133 does not include an associated payment instrument, but does include various access information that includes a user name and password to be supplied to gain access in accordance with the subscription/membership—in other embodiment and situations, a variety of other types of access control information could instead be specified and used.

This usage instruction rule set also illustrates an example of the definition of a user-defined rule, which in this example is given a user-specified name of "Allowed-Use" (e.g., for later use in referencing this user-defined rule independently of any other user-defined rule, not shown), as well as a URI-based invocation specification that when executed as indicated will provide a response indicating whether the rule is satisfied. In this example, the invocation specification includes an indication of a parameter to be filled in with information specific to a particular potential transaction by replacing the parameter "access-provider.name" enclosed in square brackets with the corresponding name from the account for the usage instruction rule set of an access provider to which this usage instruction rule set is being matched for a particular transaction. Such a user-defined rule can make a determination as to whether the rule is satisfied in a specific situation in a variety of ways and using a variety of types of information, including information about the application using the usage instruction rule set and/or the end-user executing the application program. Similarly, user-defined rules can be defined and invoked in a variety of other ways in other embodiments, including by providing executable code (e.g., a script or applet) as part of the creation of the usage instruction rule set with which the user-defined rule will be associated.

FIGS. 1D and 1E illustrate several example databases for use in storing information about user accounts and usage instruction rule sets that have been created. In particular, FIG. 1D illustrates an example Account database 140 that stores various information about user accounts that have been created, with each of the entries 140a-140b corresponding to a distinct user account. In this example, each entry includes not only information specified by the user creating the account, but also information that is automatically generated for and associated with the account. For example, entry 140a corresponds to the user account whose creation was previously discussed with respect to FIG. 1A, with columns 143-146 including information specified by the user in section 113 of FIG. 1A. In addition, when the account was created, the PHS generated a unique account ID for the account, which is stored in column 141. Furthermore, in this example user ABC was already known to the PHS or an associated system before the creation of the PHS account in FIG. 1A, and column 142 includes a user ID for user ABC that was previously associated with the user (e.g., as part of a user account previously created for user ABC, such as with a Web merchant or store).

In addition, as previously discussed with respect to FIG. 1A, in this example embodiment the PHS provides for at least some of the users the ability to use their PHS account as a payment repository and/or payment instrument. Thus, columns 149 and 150 include information corresponding to that aspect of the user's PHS account, including a current balance on the account and a maximum balance allowed for the account (e.g., a maximum balance dynamically determined in a user-specific manner at the time of account creation and optionally adjusted as appropriate based on later experience with the user)—however, since user ABC does not use the PHS account as a payment repository or instrument in this example, the current account balance is zero. While not illustrated here, a variety of other types of information may be associated with an account, such as indications of transactions that have previously been performed for an account, changes that have occurred to the account, indications of other users and associated access controls for those users to access the account, etc. Entry 140b contains similar corresponding information for the account of user CDE previously discussed with respect to FIG. 1C.

Columns 147 and 148 of the Account database 140 include information about any payment repositories and payment instruments defined for use with a user account. In particular, the information in column 147 for entry 140a corresponds to the payment repositories specified in section 114 of FIG. 1A, and the payment instrument information in column 148 of entry 140a similarly corresponds to the payment instruments specified in section 115 of FIG. 1A. In this example, each payment repository and payment instrument is given a unique ID, which are stored in the columns 147 and 148, with additional example databases Payment Repository database 180 and Payment Instrument database 190 to store information about user-specified payment repositories and user-specified payment instruments, respectively. In this example embodiment, the payment repository and instrument databases each contain multiple entries 180a-180b and 190a-190c, respectively, to correspond to individual payment repositories and instruments.

In addition, the databases 180 and 190 store a variety of information for each repository or instrument, including an automatically generated ID in columns 181 and 191, indications of the account with which the payment repository or instrument is associated in columns 182 and 192, a user-specified name for the repository or instrument in columns 183 and 193, and various information in columns 184-186 and 194-196 regarding how to use the payment repository or instrument for payment deposits or charges, respectively. In other embodiments, a variety of other types of additional information may be provided and used, such as in a manner specific to the type of instrument and/or repository (e.g., using the full name of a user associated with a credit card in order to make a charge, but not using such information for a bank account). In addition, in this illustrated example the user can define one or more restrictions regarding use of a payment repository or instrument, as previously discussed, with such restriction information stored in columns 187-188 and 197-198 in this example.

While user ABC uses a single bank account as both a payment repository and a payment instrument (corresponding to entries 180a and 190a, respectively), in this example the bank account is given distinct IDs for each of these uses (as shown in columns 181 and 191 for those entries), although in other embodiments a single ID could instead be used. In addition, while not illustrated here, in other situations a single payment source or destination (e.g., a bank account) could be used with multiple defined payment repositories and/or multiple defined payment instruments, such as to define different restrictions or other conditions with different uses of that payment source or destination. In addition, in this example user CDE has not yet designated any user-specified payment repositories or user-specified payment instruments, instead using the PHS account as a payment instrument (since user CDE does not currently receive any payments, he/she does not currently need a payment repository).

FIG. 1E illustrates a Usage Instruction Rule Set database 160 that stores information about various defined usage instruction rule sets. In particular, entry 160a corresponds to the usage instruction rule set defined by user ABC in FIG. 1B, and entry 160b corresponds to the usage instruction rule set defined by XML document 131 in FIG. 1C. In this example, each usage instruction rule set is given a unique ID (as shown in column 161) and is further provided an automatically generated unique reference token for use in later reference to the usage instruction rule set (as shown in column 163). While in this example the reference token is a long random number, in other embodiments a variety of other types of information could be used for a reference token or other reference, and in general may include any information that can reference or otherwise indicate a payment or other usage instruction set. Examples of other types of reference tokens or other references that can be used in some embodiments include a digital certificate or other credential, a public or private key of a key pair (if the PHS has access to the other key, such as by being associated with a user's account) and/or information encrypted using one of those keys or in another manner (e.g., a copy of the usage instruction set associated with the reference, information about the user to whom the reference belongs, information about a potential transaction for which the reference is being used, etc). The database 160 further includes a variety of other specified information for the usage instruction rule set, including the account ID for the account with which the usage instruction rule set is associated (as shown in column 162), a name and use type (as shown in columns 164 and 165), an optional expiration date (as shown in column 167), and an indication of one or more optional payment repositories or instruments for use with the usage instruction rule set (as shown in column 166).

The database 160 also includes an indication of the rules for the usage instruction rule set in column 168, which in this example are illustrated with rule IDs corresponding to those rules. Additional information about the rules is then provided in the Usage Instruction Rule database 170. In particular, each rule in this example has an associated unique rule ID (as shown in column 171) and an indication of the ID of the usage instruction rule set with which the rule is associated (as shown in column 172). Columns 173-177 include various information regarding how to determine whether the rule is satisfied in a particular situation, and a variety of other types of information may similarly be stored in other embodiments and situations for such rules, such as in a manner specific to different types of rules (e.g., by storing invocation details for user-defined rules).

Figure 3:
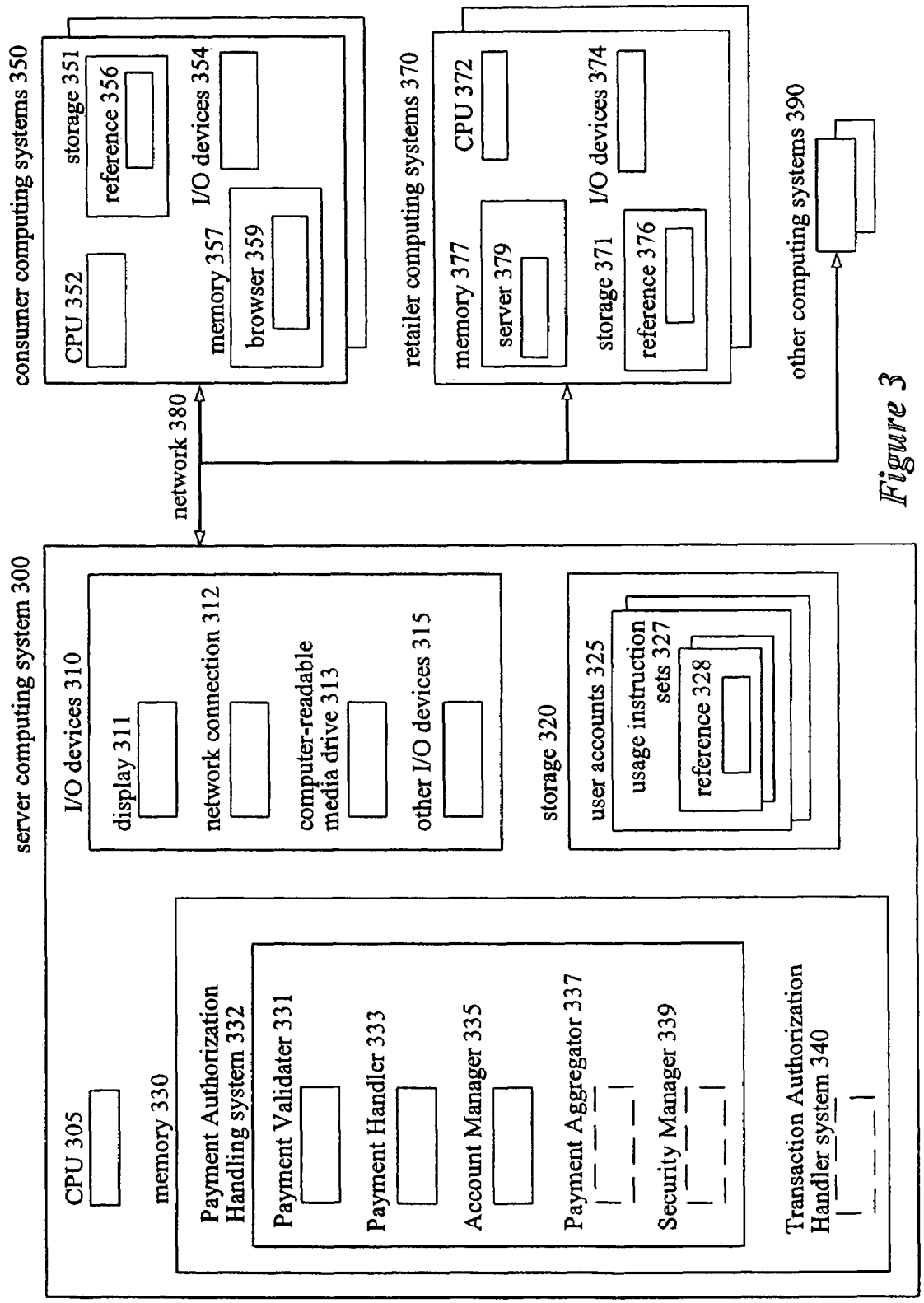
FIG. 3 is a block diagram illustrating an embodiment of a computing system suitable for executing an embodiment of a Payment Handling System.

FIG. 3 illustrates a server computing system 300 suitable for executing an embodiment of a Payment Authorization Handling system facility 332 that facilitates automatic authorization of financial payments between parties, as well as computing systems 350 and 370 for such parties. An optional Transaction Authorization Handler system facility 340 is also illustrated in this embodiment, such as to facilitate automatic authorization of transactions. The server computing system includes a CPU 305, various I/O devices 310, storage 320, and memory 330. The I/O devices include a display 311, a network connection 312, a computer-readable media drive 313, and other I/O devices 315.

An embodiment of the Payment Authorization Handling system is executing in memory, and it includes a Payment Validater component 331, a Payment Handler component 333, an Account Manager component 335, an optional Payment Aggregator component 337, and an optional Security Manager component 339. In particular, the Payment Authorization Handling system receives indications of potential payments and determines whether to authorize the payments. Such potential payments may include payments related to commerce-related transactions initiated by a consumer user of a computing system 350, such as by using a browser program 359 executing in memory 357 that interacts with a server application 379 executing in memory 377 of a computing system 370 operated on behalf of an online retailer, or instead based on any payments sent between one or more of such systems 350 and 370 and one or more other computing systems 390. While not illustrated in detail in this example embodiment, the optional Transaction Authorization Handler system may similarly contain components corresponding to some or all of the illustrated components for the Payment Authorization Handling system, such as to receive indications of potential transactions (whether having associated financial payments or not) and to determine whether to authorize the transactions.

Before initiating potential payments to be authorized, users (e.g., users of the computing systems 350 and 370) interact with the Account Manager component to create user accounts, with information 325 about the user accounts stored on storage 320. Each such user can also interact with the Account Manager to create one or more payment usage instruction sets, with information 327 about each such instruction set stored in a manner associated with the account of the user. The Account Manager in this example embodiment also creates a reference for each such usage instruction set that is created, with information 328 about the reference stored in a manner associated with the usage instruction set. If the created references are provided to users such as users of the computing system 350 and 370, those users may store the references 356 and 376 on storage 351 and 371 respectively of the computing systems for later use. While the Account Manager component is illustrated as part of the Payment Authorization Handling system in this illustrated embodiment, in other embodiments some or all of the Account Manager component functionality could instead be performed by another system with which the Payment Authorization Handling system interacts, including with the optional Transaction Authorization Handler system executing on this or another computing system.

When the Payment Authorization Handling system 332 receives an indication of a potential payment for an authorization determination and one or more references for one or more parties, the Payment Validater component retrieves stored information about the usage instruction set(s) that correspond to the reference(s) and determines whether the usage instruction set(s) are satisfied for the potential payment under the current conditions. If so, the Payment Handler component then assists in performing or otherwise handling the potential payment, such as by arranging for financial payment performance between the parties.

In some embodiments, the Payment Authorization Handling system further may include one or both of the optional Payment Aggregator component 337 and an optional Security Manager component 339. When present, the Payment Aggregator component can aggregate payments being made to and/or received from parties as appropriate, such as based on preferences of those parties and/or using other information. The Security Manager component can, when present, perform additional security-related verification of various types, such as to confirm the identity of parties, to confirm the identity and/or authorization of users supplying references, to perform user authorization for users attempting to create and/or modify user accounts and usage instruction sets, etc.

The functionality of the Payment Authorization Handling system and/or the Transaction Authorization Handler system can be accessed in various ways in different embodiments. For example, some users may have physical access to the server computing system 300, and if so can interact with the various I/O devices 310 to provide and/or receive information. Alternatively, other users can use client computer systems to directly access the system, such as remotely via network 380 (e.g., via the Internet and/or the World Wide Web). Such users can use software or other functionality provided on the client computer systems, such as browser 359 in memory 357 or a browser (not shown) executing in memory 377, to interact with system 332 and/or system 340. In other embodiments, users may instead receive functionality and/or information from system 332 and/or system 340 indirectly via interactions with one or more other computers, which may directly receive that functionality or information from system 332 and/or system 340 before providing it to the users. In addition, some or all of the components of system 332 and/or system 340 may provide various feedback or other general types of information to users (e.g., in response to user requests), and this information can be presented to the user on the display 311 of the server system or on one of the I/O devices 354 or 374 on a client system.

Those skilled in the art will appreciate that computing systems 300, 350 and 370 are merely illustrative and are not intended to limit the scope of the present invention. Computing system 300 may be connected to other devices that are not illustrated, including through one or more networks such as the Internet or via the World Wide Web ("Web"). More generally, a "client" or "server" device may comprise any combination of hardware or software that can interact, including computers, network devices, internet appliances, PDAs, wireless phones, cellphones, pagers, electronic organizers, television-based systems and various other consumer products that include inter-communication capabilities. For example, one of the computing systems 350 may be a cellphone, wireless PDA or other portable device, and a user of that phone/PDA/device may make one or more selections that result in using the capabilities of the system 332 and/or the system 340, such as to provide payments to or to otherwise handle transactions with one or more computing systems 370. In addition, the functionality provided by the illustrated system 332 components may in some embodiments be combined in fewer components or distributed in additional components. Similarly, in some embodiments the functionality of some of those illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the system 332 and/or system 340 components or data structures may also be stored as contents (e.g., as software instructions or structured data) of a computer-readable medium, such as a hard disk, a memory, a computer network or other data transmission medium, or a portable media article (e.g., a DVD or flash memory device) to be read by an appropriate drive or via an appropriate connection. Some or all of the system 332 and/or system 340 components and data structures can also be transmitted as contents of generated data signals (e.g., by being encoded as part of a carrier wave or otherwise included as part of an analog or digital propagated signal) on a variety of computer-readable data transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
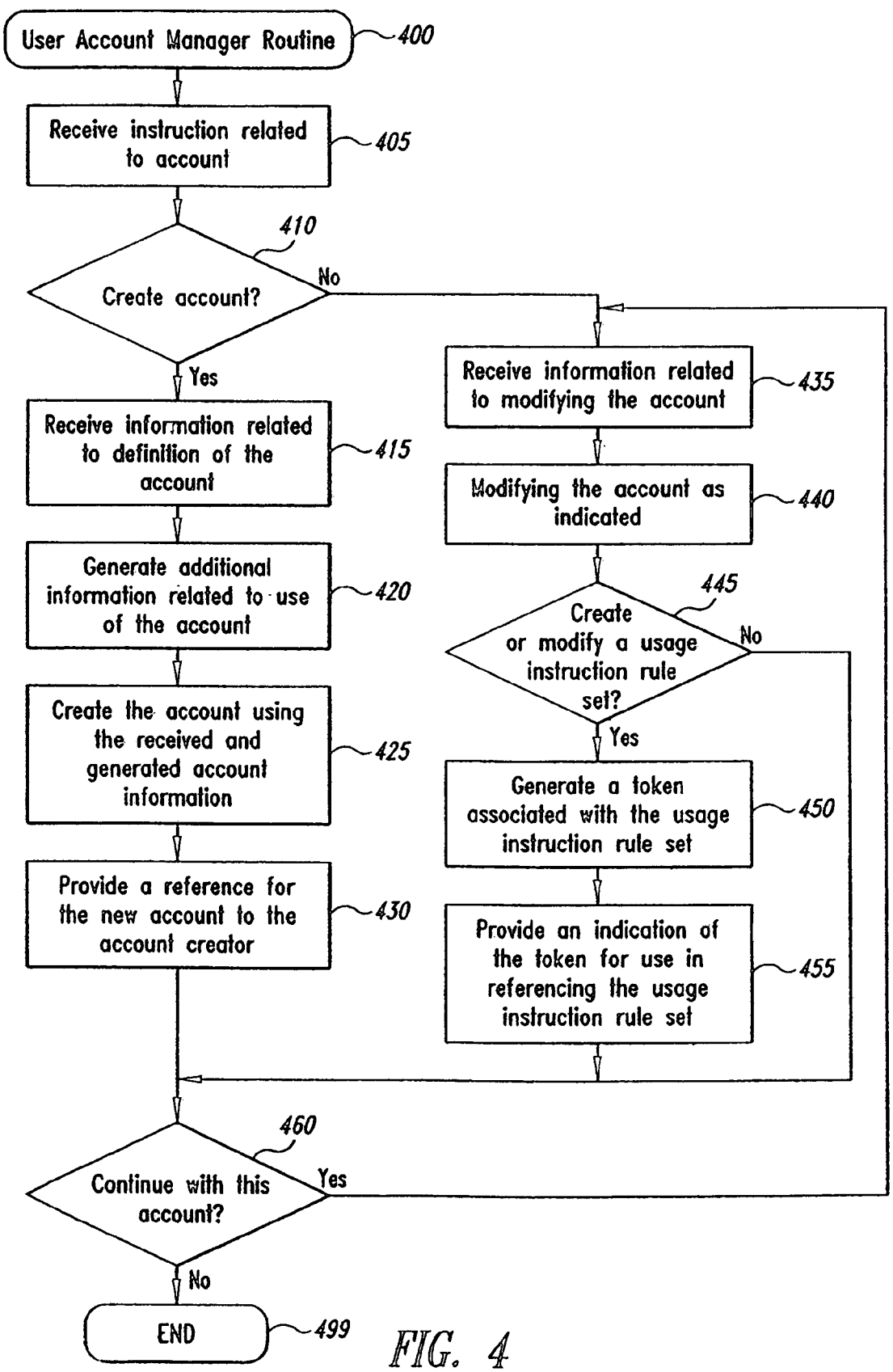
FIG. 4 is a flow diagram of an example embodiment of a User Account Manager routine.

FIG. 4 is a flow diagram of an example embodiment of a User Account Manager routine 400. The routine may, for example, be implemented by an embodiment of Account Manager component 335 of FIG. 3 or by an embodiment of an Account Manager component (not shown) of the Transaction Handler system of FIG. 3. The routine allows users to create and modify accounts for use with a payment and/or transaction authorization handling system, including defining usage instruction sets for use with the account. In some embodiments, the routine may be implemented as part of an interactive user interface with which a user can interact (e.g., as part of one or more Web pages of a Web site), while in other embodiments the routine may instead be executed in response to one or more programmatic invocations on behalf of users (e.g., as part of one or more Web services accessed on behalf of the users).

The routine begins at step 405, where an instruction related to an account is received. In step 410, the routine determines whether the instruction is related to creating an account, and if so continues to step 415 to receive various information related to the definition of the account. For example, in some embodiments a user may supply an account name, an account password or other security access mechanism, indications of one or more payment instruments for use with the account, indications of one or more payment repositories for use with the account, etc. The routine then continues at step 420 to automatically generate additional information related to use of the account, such as in some embodiments a unique account ID, a determination of a maximum balance allowed for a user if the account can be used as a payment instrument that can include charges, etc. In step 425, the routine then creates the account using the received and generated account information, and in step 430 provides a reference for the new account to the creator of the account (e.g., an indication of the account ID).

If it was instead determined in step 410 that the received instruction was not related to creating an account, the routine continues to step 435 to receive information related to modifying the account, and in step 440 modifies the account as indicated if appropriate. In step 445, the routine then determines whether the account modification included creating or modifying a usage instruction set. If so, the routine continues at step 450 to generate one or more unique references (e.g., one or more reference tokens) associated with the usage instruction set to allow later reference to the instruction set. At step 455, the routine in this illustrated embodiment then provides an indication of the reference(s) to the account owner for later use in referencing the usage instruction set, although in other embodiments the reference(s) may instead be stored for later use with the account owner in other manners (e.g., by providing information about the instruction set to the account owner when the account owner is interactively specifying a payment and/or transaction that may be authorized by the instruction set). After steps 430 or 455, or if it was instead determined in step 445 that the account instruction was not related to creating or modifying a usage instruction set, the routine continues at step 460 to determine whether to continue making modifications to the current account. If so, the routine returns to step 435, and if not the routine continues to step 499 and ends.

While not illustrated here, in other embodiments additional functionality related to user accounts could be provided, such as to allow a user to review an account by providing information about the account. In addition, in some embodiments additional security controls may be used to ensure that a user seeking to create and/or modify an account is authorized to do so. Furthermore, in some embodiments the user accounts may be associated with a company or other entity distinct from the system providing the authorization and handling capabilities.

Figure 5:
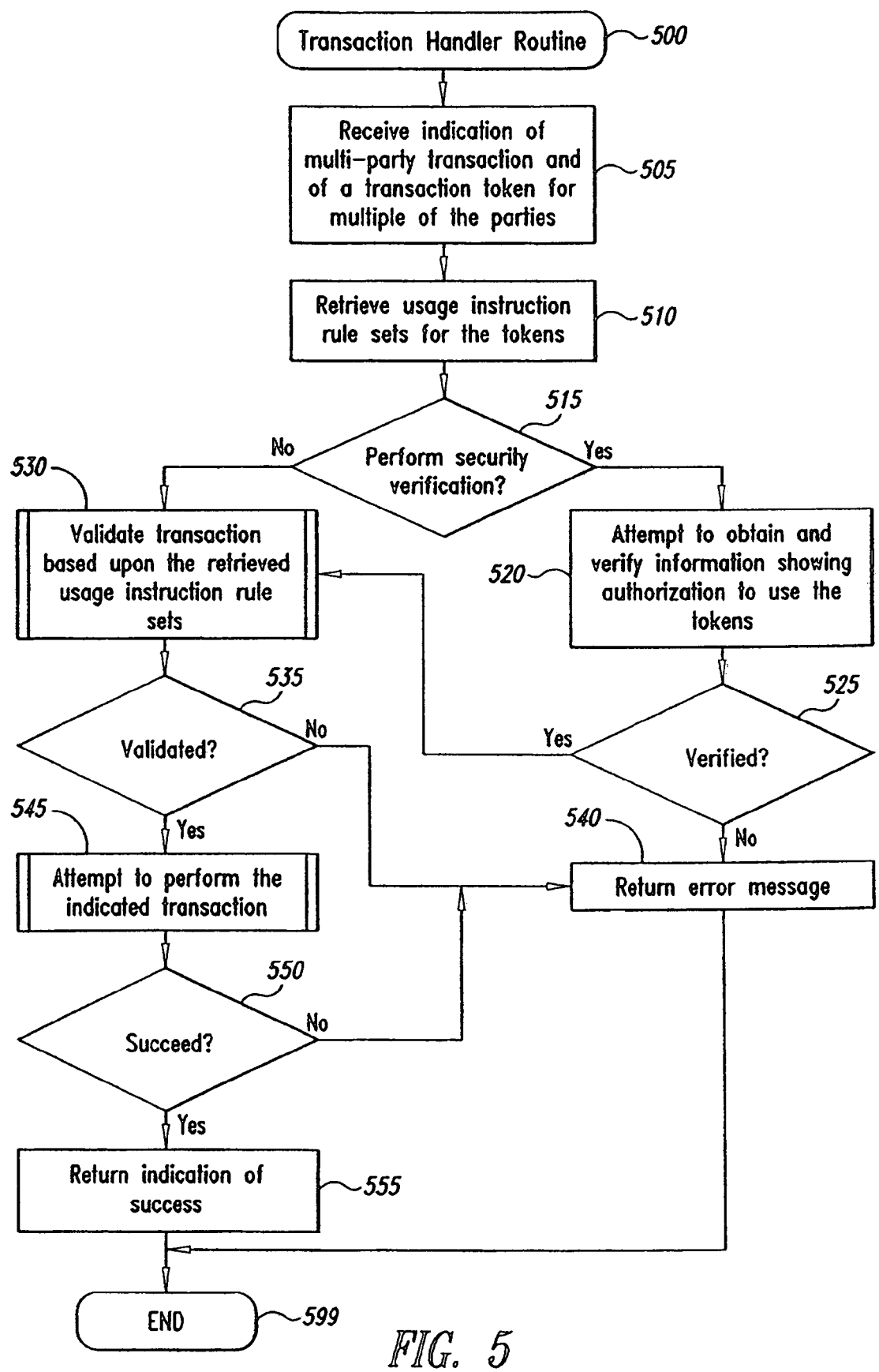
FIG. 5 is a flow diagram of an example embodiment of a payment and transaction Authorization Handler routine.

FIG. 5 is a flow diagram of an example embodiment of a payment and/or transaction Authorization Handler routine 500. The routine may, for example, be implemented by an embodiment of the Payment Validater component 331 of FIG. 3 or by an embodiment of a Transaction Validater component (not shown) of the Transaction Handler system of FIG. 3. The routine receives indications of payments and/or transactions to be authorized or otherwise handled and of one or more references (e.g., reference tokens) corresponding to one or more usage instruction sets from one or more parties, and determines whether to authorize the payment and/or transaction based on the usage instruction sets. In some embodiments, the routine is invoked programmatically, such as via one or more Web services, although in other embodiments the routine could instead be invoked in other manners (e.g., interactively via a graphical user interface).

The routine begins in step 505, where an indication is received of a multi-party payment and/or transaction and of one or more references, such as at least one reference for each of multiple of the parties (e.g., one for each of the two or more parties to the payment/transaction). The routine then continues to step 510 to retrieve the usage instruction sets corresponding to the references, and may in some embodiments further retrieve or otherwise make available other information from the user accounts to which some or all of those usage instruction sets belong.

The routine then continues to step 515 to determine whether to perform a security verification to determine whether the parties are allowed to use the usage instruction sets, such as based on additional security information provided by the parties. If so, the routine continues at step 520 to attempt to obtain and verify security information showing authorization of the parties, and in step 525 determines whether such authorization was verified. In other embodiments, such security or other access authorization may instead not be performed, such as when the use of the instruction sets will contain rules or other conditions or restrictions that control when the usage instruction sets are allowed to be used.

Figure 6:
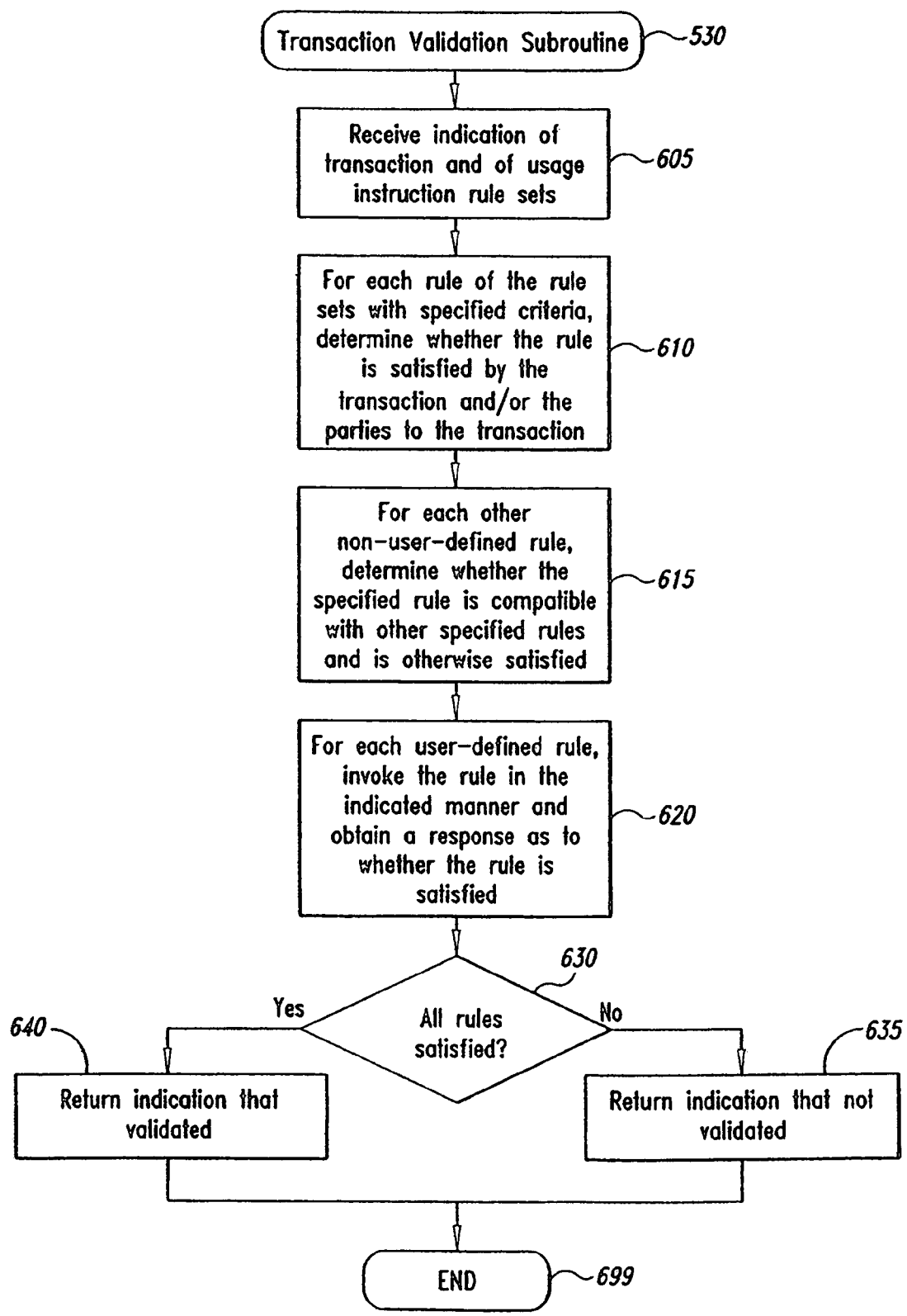
FIG. 6 is a flow diagram of an example embodiment of a payment and transaction Validation subroutine.

If it was determined in step 525 that the authorization was verified, or if it was instead determined in step 515 not to perform the security verification, the routine continues to execute subroutine 530 to validate the payment and/or transaction based upon the retrieved usage instruction sets, as discussed in greater detail with respect to FIG. 6. If it is determined in step 535 that the payment and/or transaction is validated, the routine continues to execute subroutine 545 to attempt to make the financial payment or to otherwise facilitate performance of the indicated transaction, such as in a manner specific to the type of transaction, as discussed in greater detail with respect to FIGS. 7A and 7B. In other embodiments, the routine may instead merely determine whether the payment and/or transaction are authorized, leaving performance of the payment and/or transaction for others.

After step 545, if it is determined in step 550 that the indicated payment/transaction performance succeeded, the routine continues to step 555 to return an indication of success, such as in a response XML document if the routine 500 was invoked as part of a Web service. If it was instead determined in step 525 that the authorization was not verified, or in step 535 that the payment or transaction was not validated, or in step 550 that the performance did not succeed, the routine continues instead to step 540 to instead return an error message, such as an XML document sent as a response if the routine was invoked as part of a Web service. After steps 540 or 555, the routine continues to step 599 and ends.

FIG. 6 is a flow diagram of an example embodiment of a payment and/or transaction Validation subroutine 530. The subroutine receives an indication of a payment and/or transaction and of at least one usage instruction set specified by one or more parties, and determines whether to validate the payment or transaction based on the rules or other conditions and information of the usage instruction set(s).

The subroutine begins at step 605, where an indication is received of a payment and/or transaction and of one or more usage instruction sets. In step 610, for each rule or other condition of one of the usage instruction sets that specifies criteria or circumstances in which the usage instruction set can be used and/or that specifies information about parties with which the usage instruction set can be used, information about the payment and/or transaction and/or those other parties is retrieved in order to determine whether the conditions are satisfied. For example, to obtain information about another party, information from a user account associated with that other party may be obtained (e.g., the user account with which the usage instruction set for the reference from that other party is associated), as well as information about the other parties that may be accessible in other manners (e.g., based on the invocation requests for the authorization handling routine, such as from an HTTP header used as part of a Web services invocation). Similarly, information about the payment and/or transaction may be available based on information received as part of the routine invocation (e.g., as part of a supplied payment or transaction object or document), or instead from an external source.

After step 610, the subroutine continues at step 615 to identify other specified rules or conditions that are not user-defined and that specify other criteria related to allowable payments or transactions, and determines whether any such other rules or conditions are satisfied (e.g., by being compatible with rules or conditions from other specified usage instruction sets and/or the payment or transaction itself). The subroutine then continues at step 620 and invokes any user-defined rules or conditions in the manner specified for those rules or conditions, and obtains responses indicating whether those rules or conditions are satisfied. After step 620, the subroutine continues to step 630 to determine whether all of the rules or conditions for the specified usage instruction sets were satisfied. If so, the subroutine continues to step 640 and returns an indication that the payment or transaction is validated, and if not continues instead to step 635 to return an indication that the payment or transaction is not validated. After steps 635 or 640, the subroutine continues to step 699 and ends.

In other embodiments, the validation could instead be performed in other manners, such as by evaluating the various types of rules or other conditions in different orders and/or stopping further evaluation if any rule or condition is found to not be satisfied. Alternatively, in other embodiments, determination of whether a payment or transaction is validated may be performed in manners other than requiring unanimous satisfaction of all specified rules or conditions, such as if usage instruction sets themselves specify other types of inter-relationships among the rules or conditions of those instruction sets and/or based on other predefined criteria (e.g., a minimum threshold for a percentage or subset of specified rules or conditions that must be satisfied).

Figure 7A:
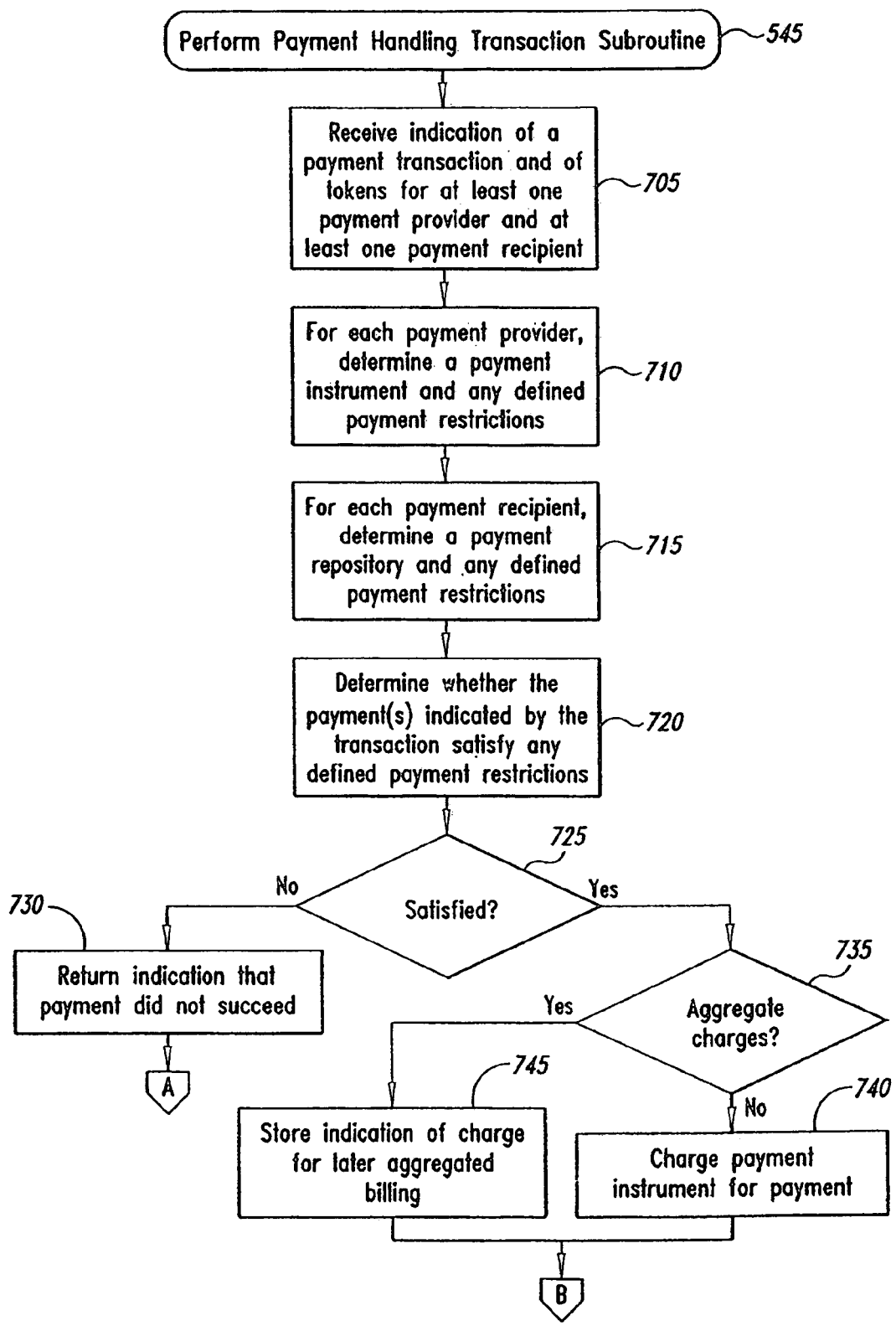
FIGS. 7A and 7B are a flow diagram of an example embodiment of a Perform Payment Handling subroutine.
Figure 7B:
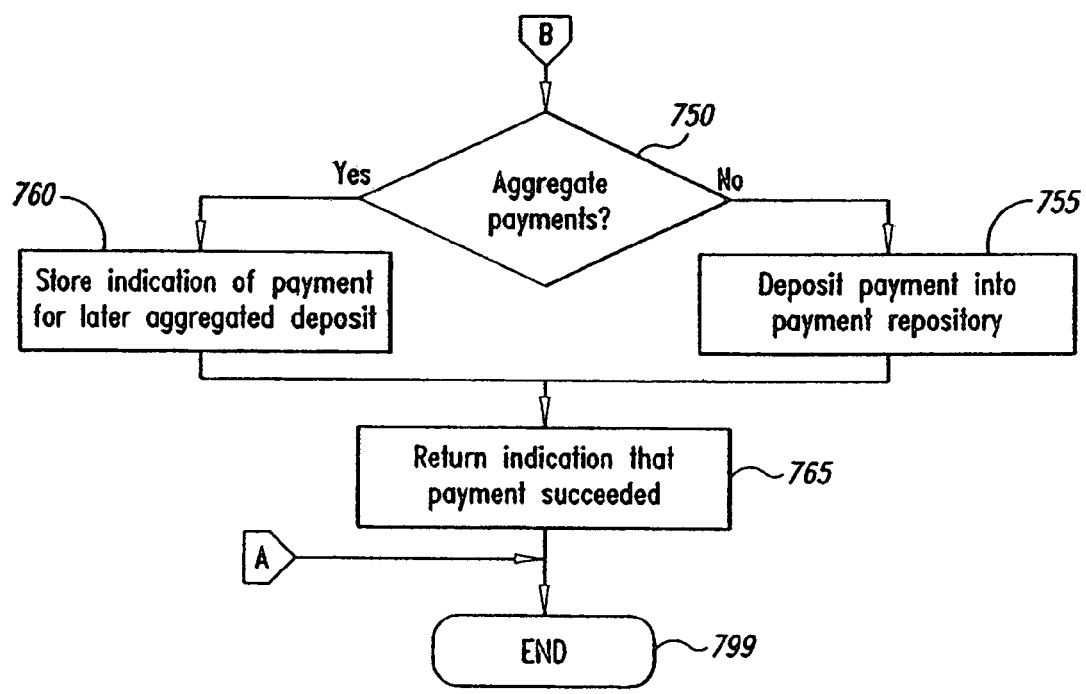

FIGS. 7A and 7B are a flow diagram of an example embodiment of a Perform Payment Handling subroutine 545. This subroutine is an example of one type of handling that may be performed, in this case being handling of one or more associated payments (e.g., for a transaction in which at least one part to the transaction is to provide payment to at least one other party to the transaction). The subroutine may, for example, be implemented by an embodiment of the Payment Handler component 333 and/or the Payment Aggregator component 337 of FIG. 3, or by an embodiment of similar components (not shown) of the Transaction Authorization Handler system of FIG. 3.

The subroutine begins in step 705, where an indication is received of a potential payment transaction (e.g., of a payment amount and possibly of other payment-related terms) and of one or more references (e.g., reference tokens) for each of at least one of one or more payment providers and of one or more payment recipients. In step 710, the subroutine determines a payment instrument to be used for each payment provider and any defined payment restrictions for that payment instrument, such as based on a payment instrument associated with a usage instruction set corresponding to a reference supplied by the payment provider. Similarly, in step 715 the subroutine determines a payment repository to be used for each payment recipient as well as any defined payment restrictions, such as based on a payment repository associated with a usage instruction set corresponding to a reference supplied by the payment recipient. In step 720, the subroutine then determines whether the one or more indicated payments satisfy any defined payment restrictions for the payment instruments and/or repositories, such as based on minimum or maximum current charges, minimum or maximum cumulative balances, etc.

After step 720, the subroutine continues at step 725 to determine whether the payments satisfy any defined payment restrictions, and if so continues to step 735 to, for each such payment, determine whether to bill the payment instrument for the charge separately or instead to aggregate the payment along with other payments, such as on a periodic basis (e.g., monthly) or until a minimum cumulative charge is reached. If it is determined not to aggregate the charge for a payment, the subroutine continues to step 740 to immediately charge the corresponding payment instrument for the payment, while if it is instead determined in step 735 to aggregate the charges, the subroutine continues to step 745 to store an indication of the charge for later aggregated billing for that payment instrument. While not illustrated, steps 735-745 can be repeated multiple times for each payment if multiple payments are to occur.

After steps 740 or 745, the subroutine continues in step 750 to determine whether to deposit each payment directly in the corresponding payment repository or to instead aggregate the payment along with other payments before depositing the aggregate payments. If it is determined not to aggregate the payments, the subroutine continues to step 755 to immediately deposit each such payment into the appropriate payment repository, while if it is instead determined in step 750 to aggregate a payment the subroutine continues instead to step 760 to store an indication of the payment for later aggregated deposit into the appropriate payment repository. While not illustrated here, steps 750-760 can be performed for each payment to be made if multiple payments are to occur.

After steps 755 or 760, the subroutine continues to step 765 to return an indication that the payment succeeded. If it was instead determined in step 725 that an indicated payment did not satisfy one or more defined payment restrictions, the subroutine continues instead to step 730 to return an indication that the payment did not succeed. In some embodiments, the ability to aggregate payments and/or deposits is considered when determining whether any defined payment restrictions are satisfied, such as to allow multiple payments or deposits to satisfy minimum amount restrictions, while in other embodiments each such payment is individually considered. Alternatively, in other embodiments the payment deposit aggregation and/or payment charge aggregation may not be performed. After steps 730 or 765, the subroutine continues to step 799 and ends.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

In at least some embodiments, the authorization system may further provide a variety of additional types of functionality. For example, the authorization system may in some embodiments provide various incentives to users to use the authorization system, such as by providing discounts, rebates, etc. In addition, in some embodiments the authorization system may further take additional steps to prevent or minimize fraudulent activities. Thus, in some embodiments, in addition to verifying that a usage instruction set authorizes a payment or transaction and/or to corroborating an identity of a user seeking to create or use a usage instruction set, the authorization system may perform various other types of processing in an attempt to identify fraudulent potential payments or potential transactions. Such other processing may include, for example, attempting to identify patterns across multiple payments/transactions (e.g., to identify atypical payments/transactions) and/or attempting to obtain additional information related to a potential payment/transaction (e.g., when an increased likelihood of fraud has been detected, on a random periodic basis, etc.), such as by interacting with one or more parties and/or external information sources.

In addition, as previously noted, the authorization system may in some embodiments provide functionality to facilitate refunds or other corrective measures when disputes or other problems occur, such as by limiting access of payment receivers to payments for a limited period of time and/or by providing underwriting or insurance services that guarantee or provide payments or corresponding paid-for items or services. More generally, in at least some embodiments the authorization system may automatically enforce any dispute-related conditions specified in the one or more usage instruction sets used to authorize a transaction or a related financial payment, such as based on the conditions having formed a binding agreement between the parties to the transaction. In addition, the authorization system may further provide users with various types of access to information about their accounts, their defined usage instruction sets, any prior activity using their usage instruction sets, ongoing subscriptions to services that are associated with the user account and/or purchased using a usage instruction set, etc., such as in an interactive manner (e.g., via one or more Web pages provided by the authorization system) and/or in a programmatic manner (e.g., via a Web services-based or other API provided by the authorization system). Using such interactive or programmatic mechanisms, users may be able to obtain information about prior payments or transactions, and immediately dispute a payment or transaction by selecting it (e.g., in an interactive manner) and optionally providing a reason for the dispute. The authorization system may then take various activities to handle such disputes, including notifying some or all other parties to the disputed payment or transaction, freezing or withholding any corresponding payments until the dispute is resolved, immediately providing a refund to a consumer who disputes a payment to a retailer (e.g., by debiting a bank or other financial account from which the consumer had made the disputed payment), etc.

In addition, in at least some embodiments, the authorization system further performs additional activities related to disputes so as to attempt to automatically identify any fraud or abuse related to such disputes. For example, as previously discussed, various fraud identification techniques may be used to look for patterns or other indicia of fraud, and if detected the authorization system may take additional activities related to those disputes (e.g., initiating human review of the dispute, withholding any payment refund that would otherwise be provided, etc.). In addition, in at least some embodiments the authorization system make take actions to ensure that any disputes and refunds are handled via the authorization system rather than via a third-party entity (e.g., a provider of a bank or other financial account from which or to which a payment was made), such as by regulating such activities in a contractual manner, initiating automatic or human monitoring of underlying financial accounts to determine if any such unauthorized behavior occurs, freezing use of any authorization system accounts (and/or associated usage instruction sets) of users who engage in such unauthorized behavior, etc. Moreover, the authorization system may track information about such disputes, such as to identify users (whether payment providers or payment recipients) who are engaged in a number of disputes that exceed a threshold (whether for all such disputes, or only disputes determined to be unjustified)—various activities may then be taken regarding any such identified users, such as to warn or notify other parties (e.g., other parties to any potential payments or transactions involving such users) and/or to regulate or prevent additional use by such identified users of functionality provided by the authorization system. Furthermore, in some embodiments the authorization system may charge a fee to one or more parties for some or all such dispute-related activities, such as to a party found to have behaved improperly (such as in causing a bona-fide dispute or in misreporting a dispute that is not bona-fide) or for all disputes.

As previously noted, in at least some embodiments the authorization system may provide to users access to various types of information about their accounts, their defined usage instruction sets, any prior activity using their usage instruction sets, ongoing subscriptions to services that are associated with the user account and/or purchased using a usage instruction set, etc. More generally, in at least some such embodiments the authorization system further may provide various types of reports or summaries to assist users, and may further provide various types of monitoring and/or notification capabilities so that users are automatically apprised when events of interest occur, such as in an electronic manner (e.g., via email, instant messaging, a phone call, etc.). For example, users may be interested in any use of a specified or any defined instruction set, or instead may specify various criteria to identify only certain occurrences of interest (e.g., based on the size of payments made, the volume or frequency of payments or other uses, etc.). Furthermore, receiving such information may allow a user to manage their account and defined usage instruction sets in various ways, such as to dynamically modify specified conditions for a usage instruction set (e.g., to limit volume and/or a type of use of the usage instruction set by other authorized users for a specified period of time, until specified conditions are satisfied, or until further notice). Furthermore, retailers and other payment recipients may further use such information to dynamically modify other aspects related to payments and/or transactions, such as to modify pricing information for items being offered to consumers.

Various additional details regarding providing dispute-related capabilities, providing account-related information, and performing verification and other corroboration of information related to users are included in co-pending U.S. patent application Ser. No. 10/991,339, filed Nov. 16, 2004 and entitled "Using Corroborated Information About Users to Facilitate User Performance of Tasks," and in co-pending U.S. patent application Ser. No. 10/766,697, filed Jan. 27, 2004 and entitled "Providing A Marketplace For Web Services," each of which is hereby incorporated by reference in its entirety.

The following provides illustrative examples of techniques for defining and using usage instruction sets and rules or other conditions for the instruction sets, such as in embodiments in which tokens are used for instruction set references, although the invention is not intended to be limited to these details.

An example of limiting a transaction to a particular payment sender or recipient is as follows:

ALLOWED RECIPIENT TOKEN recipientToken == 'token1';

If the recipient's token exactly matches token1 the transaction will be allowed. This rule is available to all parties (sender, recipient, caller). Examples of specifying multiple allowed recipient tokens include the following:

RecipientToken in (' token1', 'token2', 'token3');

or, in an alternative embodiment, recipientToken == 'token1' or recipientToken == 'token2' or recipientToken == 'token3';

BLOCKED SENDER TOKEN senderToken != 'token1';

The transaction will be disallowed if the sender's token matches token1. This rule is available to all parties (sender, recipient, caller). Examples of specifying multiple blocked senders include the following:

SenderToken notIn ('token1', 'token2', 'token3');

or, in an alternative embodiment, senderToken != 'token1' and senderToken != 'token2' and senderToken != 'token3';

An example of creating a secret handshake is as follows:

This is an example of the sender and recipient exchanging a secret handshake to agree on some term. If both parties do not have rules like this defined, then the transaction will be disallowed.

SENDER SECRET string SharedSecretSender := 'rumplestilskin';

SharedSecretSender == SharedSecretRecipient;

For the secret handshake rule, if the sender and recipient do not define the same value, the transaction will be disallowed. Any string can be used in place of 'rumplestilskin', and any reference name can be used in place of SharedSecretSender and SharedSecretRecipient, as long as it is not a predefined reference.

RECIPIENT SECRET string SharedSecretRecipient := 'rumplestilskin';

SharedSecretSender == SharedSecretRecipient;

For the secret handshake rule, if the sender and recipient do not define the same value, the transaction will be disallowed. Any string can be used in place of 'rumplestilskin', and any reference name can be used in place of SharedSecretSender and SharedSecretRecipient, as long as it is not a predefined reference.

An example of creating a limited-use reference token is as follows:

Payment instruction rule sets can limit the number of times a token can be used to make a payment, the total amount that the token is used for, or the expiration date of a token. These rules apply only to the usage of that token, so a sender's payment instruction rule set can only limit the usage of the sender's token. Likewise, the same applies for the caller and recipient.

SINGLE USE TOKEN

MyTokenUseCount <= 1;

or, in an alternative embodiment, tokenTransactionCount == 1;

This rule causes the token to stop working after it has been used once. It applies only to its own payment instruction rule set, so a sender's instruction set can only limit the usage.

LIMIT NUMBER OF TIMES USED

MyTokenUseCount <= 5;

or, in an alternative embodiment, tokenTransactionCount <= 5;

This rule causes the token to stop working after it has been used 5 times.

LIMIT TOTAL AMOUNT

MyTokenuseTotalAmount <= 'USD 50';

or, in an alternative embodiment, tokenTransactionAmount <= $50;

This rule limits the total amount this token is used for to USD 50.

EXPIRATION DATE

TransactionTimestamp < '30-Jan-2005';

or, in an alternative embodiment, transactionRequestDate < dateTime '30-Jan-2005';

This rule causes the token to stop working on Jan. 30, 2005. From midnight on this date (00:00 GMT) and onwards, all transactions using this token are disallowed.

USE ONLY AS RECIPIENT

MyRole == 'recipient';

This rule causes the token to disallow payment unless this token is used as the recipient's token.

USE ONLY AS CALLER

MyRole == 'caller';

This rule causes the token to disallow payment unless this token is used as the caller's token.

USE ONLY AS RECIPIENT

MyRole == 'sender';

This rule causes the token to disallow payment unless this token is used as the sender's token.

An example of limiting the amounts of a transaction is as follows:

Transaction amount limit rules are available to all parties.

MAXIMUM TRANSACTION AMOUNT transactionAmount <= 'USD 50';

This rule limits the transaction amount to USD 50 or less. If the transaction is greater than this amount, this rule will disallow the transaction.

MINIMUM TRANSACTION AMOUNT transactionAmount >= 'USD 1';

This rule limits the transaction amount to USD 1 or greater. If the transaction is less than this amount, this rule will disallow the transaction.

LIMIT TRANSACTION CURRENCY getCurrency(transactionAmount) == 'JPY';

This rule limits the transaction currency to Japanese Yen. If the transaction currency is not Japanese Yen, then the transaction will be disallowed.

An example of a payment provider/sender specifying payment details is as follows:

The sender specifies the payment method, such as whether the payment is being made from a credit card, an ACH bank account, or from an existing account balance.

BALANCE TRANSFER string paymentMethod := 'balance transfer';

This rule specifies that funds will be taken from an existing account balance.

DEFAULT ACH BANK ACCOUNT string paymentMethod := 'ach';

This rule specifies that a default ACH bank account for the account will be used. The default ACH account can be specified in various ways, such as via CrateAccount or SetDefaultFinancialInstrument messages.

SPECIFIC ACH BANK ACCOUNT string paymentMethod := 'ach';

string paymentInstrument := 'financialInstrumentReference';

This rule specifies a specific ACH bank account referred to by fnancialInstrumentReference. A financial instrument reference is returned from the installACHBankAccount message. In this example, a financial instrument reference is not a bank account number, which in some embodiments may not be included in payment instruction rule sets for privacy reasons. The PaymentMethod should be specified to allow assertions to be made against it in other payment instruction rule sets.

DEFAULT CREDIT CARD string paymentMethod := 'credit card';

This rule specifies that the default credit card for the account will be used. The default credit card can be specified in various ways, such as via CrateAccount or SetDefaultFinancialInstrument messages.

SPECIFIC CREDIT CARD string paymentMethod := 'credit card';

string paymentInstrument := 'financialInstrumentReference';

This rule specifies a specific credit card bank account referred to by financialInstrumentReference. A payment instrument reference is returned from the installCreditCard message. In this example, a financial instrument reference is not a credit card number, which in some embodiments may not be included in payment instruction rule sets for privacy reasons. The PaymentMethod should be specified to allow assertions to be made against it in other payment instruction rule sets.

An example of a payment recipient specifying dispute resolution policies is as follows:

Dispute Resolution may happen when the sender registers a dispute about a particular transaction. If specified by the recipient's payment instruction rule set, an automatic refund will be issued from the recipient to the sender to resolve the dispute. A dispute is initiated by the sender, and is governed by the dispute resolution policies specified by the recipient. In this example embodiment, ordinary refunds are not disputes and can be requested by the recipient at any time, and will always succeed, regardless of the dispute resolution policies specified by these rules.

'SENDER WINS' TIME LIMIT duration senderWinsTimeLimit :='15 days';

or, in alternative embodiments, senderWinsTimeLimit := duration 'P15D';

This rule specifies that if the sender registers a dispute within 15 days of the transaction, an automatic refund will be issued.

NO AUTOMATIC REFUND duration SenderWinsTimeLimit := '0 days';

or, in an alternative embodiment, senderWinsTimeLimit := duration 'P0D';

This rule specifies that there will be no automatic refund issued if the sender registers a dispute.

'SENDER WINS' REFUND FRACTION OR PERCENTANGE LIMIT number SenderWinsRefundFraction := 50%;

or, in an alternative embodiment, senderWinsPercentLimit := 50%;

This rule specifies only 50 percent of the transaction amount will be refunded to resolve a dispute.

An example of a caller/end-user or payment recipient limiting the payment method is as follows:

The caller and/or recipient can place limits on where the funds come from. For example, if the caller is paying for the transaction fees, the caller might wish to make sure that the source of funds is not a 'credit card', since credit cards transaction fees are higher than other methods.

BALANCE TRANSFERS ONLY paymentMethod == 'balance transfer';

This rule will disallow the transaction if the payment method is not a balance transfer.

BALANCE TRANSFERS AND ACH ONLY paymentMethod == 'balance transfer' or paymentMethod == 'ach';

This rule will disallow the transaction if the payment method is not a balance transfer or ACH.

NO CREDIT CARDS paymentMethod != 'credit card';

This rule will disallow the transaction if the payment method is a credit card.

An example of limiting the fraction of a fee paid is as follows:

Fee percentages are passed into the Pay message by the caller. Any party can use these rules.

LIMIT SENDER'S FRACTION OF THE TOTAL FEE

SenderFractionOfFee <= 50%;

or, in an alternative embodiment, senderFeePercent <=50%;

This rule will disallow the transaction if the sender is paying more than 50% of the total fees paid.

LIMIT RECIPIENT'S FRACTION OF THE TOTAL FEE

RecipientFractionOfFee <= 80%;

or, in an alternative embodiment, recipientFeePercent <= 80%;

This rule will disallow the transaction if the recipient is paying more than 80% of the total fees paid.

LIMIT CALLER'S FRACTION OF THE TOTAL FEE callerFractionOfFee <= ⅓;

or, in an alternative embodiment, callerFeePercent <= ⅓;

This rule will disallow the transaction if the recipient is paying more than ⅓ of the total fees paid.

Examples of context data available for payment instruction rule sets and that can be sent as an XML document as part of a pay request message (e.g., from a caller to the transaction authorizer) are as follows:

| Parameter | Value Type | Description |
| --- | --- | --- |
| callerCredential | string | Created and authenticated by a credential service to validate the caller's identity |
| senderToken | string | Identifies the sender's payment instruction rule set in their account |
| recipientToken | string | Identifies the recipient's payment instruction rule set in their account |
| callerToken | string | Identifies the caller's payment instruction rule set in their account |
| senderFractionOfFees | number | The fraction of the fee amount that will be paid by the sender |
| recipientFractionOfFees | number | The fraction of the fee amount that will be paid by the recipient |
| callerFractionOfFees | number | The fraction of the fee amount that will be paid by the caller |
| transactionAmount | money | The amount of the payment between sender and recipient |
| SenderTxnReference | string | A description of the transaction that is meaningful to the sender - in some situations this may be optional |
| RecipientTxnReference | string | A description of the transaction that is meaningful to the recipient - in some situations this may be optional |
| CallerTxnReference | string | A description of the transaction that is meaningful to the caller - in some situations this may be optional |
| ServiceDescription | string | Description of the service or product being provided (for which payment is being made) - in some situations this may be optional |

Examples of context data available for tokens are as follows:

| Parameter | Value Type | Description |
| --- | --- | --- |
| tokenTransactionCount | number | The number of transactions approved by this token, including the current transaction. |
| tokenTransactionAmount | money | The total amount of all transactions approved by this token, including the current transaction. |

An example of using payment instruction rule sets to authorize a payment for a transaction is as follows:

In this example, the transaction includes a caller party requesting a Web service from a recipient party using an application program provided by a sender party. The caller is paying for the fees associated with the requested service that are charged by the transaction authorizer, the sender is paying for the cost of the transaction, and the transaction amount is USD $50.00. The values of the parameters passed in as part of the transaction authorization call to a third-party transaction authorizer are:

CallerFractionOfFees := 100%

SenderFractionOfFees := 0%

RecipientFractionOfFees := 0%

TransactionAmount := USD 50.00

Any optional parameters are saved with the transaction, but don't affect the execution of the transaction.

Data Retrieval and Account Verification

The transaction authorizer receives the transaction authorization call from the caller, which includes tokens for the caller, recipient and sender, and retrieves data associated with the tokens. The data retrieved is the following:

Account Information for each of the parties, as identified by the corresponding Token:

Account ID

Status (Active, Closed, Suspended)

Balance

Available Balance

The transaction authorizer verifies that the accounts for the various parties exist and are all active. If any of the accounts are inactive, then the transaction is disallowed and an error is returned. Otherwise, the transaction authorizer continues to retrieve data associated with the payment instruction rule sets:
Payment Instruction Rule Sets and Statistics for each of the parties, by Token:
Payment Instruction Rules
Usage Total Count: number of transactions allowed by the token so far
Usage Total Amount: sum of transaction amounts (absolute value) allowed by the token so far
The transaction authorizer's own Payment Instruction Rules, for specifying fees, defaults, and allowed values.
The instruction sets are shown below for each of the token roles, and are then described.

Sender:
limit to $50 per transaction

TransactionAmount <= 'USD 50';
limit token usage to 10 and $75 total, whichever comes first TokenTransactionCount <= 10;

TokenTransactionAmount <= 'USD 75';
token expires on Jun 1, 2004

TransactionDate <= '2004-Jun-1';
refuse to pay any fees

SenderFractionOfFees == 0%;
withdraw funds from the sender's default ACH account string PaymentMethod := 'ach';
dispute resolution: recipient must allow dispute refunds for 10 days or more, at 90% or more SenderWinsTimeLimit >= '10 days';

SenderWinsFractionLimit >= 90%;

Recipient:
token expires on Oct 1, 2004

TransactionDate <= '2004-Oct-1';
caller must pay all fees

CallerFractionOfFees == 100%;
dispute resolution: allow dispute refunds for 10 days or more, at 100% duration SenderWinsTimeLimit := '10 days';

number SenderWinsFractionLimit := 100%;

Caller:
fail if the payment method is not ACH or balance transfer

PaymentMethod in ('ach', 'balance transfer');

The Transaction Authorizer:
fail if the payment method is not ACH, balance transfer, or credit card PaymentMethod in ('ach', 'balance transfer', 'credit card');

The transaction authorizer merges the retrieved data with the data received in the pay request message in the authorization call, and evaluates the payment instruction rule sets of the various parties.

Evaluate Payment Instruction Rule Sets

The following discusses the evaluation, showing the interaction between the various payment instruction rules. The payment instruction rule sets presented here all agree.

Sender:
limit to $50 per transaction

TransactionAmount <= 'USD 50';

The sender is limiting the amount of each transaction to $50. This does not limit the total usage of the token (see next item).

Sender:
limit token usage to 10 uses total

MyTokenUseCount <= 10;
limit token usage to $75 total

MyTokenTotalAmount <= 'USD 75';

The sender is limiting the usage of the token to 10 uses or $75 total, whichever comes first.

Sender:
token expires on Jun 1, 2004

TransactionDate <= '2004-Jun-1';

Recipient:
token expires on Oct 1, 2004

TransactionDate <= '2004-Oct-1';

The sender's token can only be used until Jun. 1, 2004, while the recipient's token can be used until Oct. 1, 2004.

Sender:
refuse to pay any fees

SenderFractionOfFees == 0%;

Recipient:
caller must pay all fees

CallerFractionOfFees == 100%;

The sender asserts that she will not pay any fees. The recipient has a more stringent requirement, that the caller is paying all fees.

Sender:
withdraw funds from the sender's default ACH account

PaymentMethod := 'ach';

Caller:
fail if the payment method is not ACH or balance transfer

PaymentMethod in ('ach', 'balance transfer');

The Transaction Authorizer:
fail if the payment method is not ACH, balance transfer, or credit card PaymentMethod in ('ach', 'balance transfer', 'credit card');

The sender is setting the payment method to be ACH, which means that funds will be withdrawn from the default ACH bank account associated with the sender's Account with the transaction authorizer. Since the caller is paying 100% of the fees, the caller makes an assertion that the payment method must be either ACH or a balance transfer, to keep her costs down. The transaction authorizer's payment instruction rule set makes sure that the PaymentMethod is set, and restricts its values.

Recipient:
allow dispute refunds for 10 days after the transaction date duration SenderWinsTimeLimit :='10 days';
allow dispute refunds at 100% number SenderWinsFractionLimit := 100%;

Sender:

recipient must allow dispute refunds for 10 days or more

SenderWinsTimeLimit >= '10 days';

recipient must allow dispute refunds at 90% or more

SenderWinsRefundFraction >= 90%;

The recipient specifies a dispute resolution policy that allows the sender to receive a 100% refund for up to ten days after the transaction date. The sender refuses to pay unless the recipient specifies a dispute resolution policy that she agrees to: 90% or more refunds for at least 10 days after the transaction date. The sender and recipient are in agreement.

Execute Transaction

From the evaluation of the payment instruction rule sets, the following variables are known:

a PaymentMethod := 'ach'
a SenderWinsTimeLimit := 10 days
a SenderWinstFractionLimit := 100%

The transaction authorizer looks up the default ACH financial instrument for the sender to use as the source of funds for the primary transaction. According to the fee schedule, ACH transactions cost $0.60 for the $50 transaction (1.0%+$0.10 per transaction). The transaction authorizer also generates a Transaction ID that will be returned to the caller. Based on all this, the transaction authorizer executes the following:

a withdraws $50.00 from the sender's bank account via ACH
deposits $50.00 in the sender's account at the transaction authorizer
performs a balance transfer from the sender's transaction authorizer account to the recipient's account at the transaction authorizer for $50.00
a performs a balance transfer from the caller's account at the transaction authorizer to the transaction authorizer for $0.60

The references and descriptions, along with the dispute resolution variables, are all stored in the transaction data. Account balances are updated in the course of executing the above transaction.

Pay Response Message

Since the transaction was successful, a Transaction ID is returned to the caller as part of a pay response message.

| Parameter | Type | Description |
|---|---|---|
| TransactionID | String | A reference to the transaction that can be supplied back to the transaction authorizer for queries, refunds, disputes and other operations. |

In some embodiments, usage instruction rule sets are used to check to see if some event is to be authorized or not, and include a set of rules (also referred to as "assertion expressions" or "assertions") that are evaluated against context data—if the rules/assertions evaluate to true for a given set of context data, then the event is authorized. An example of a language for defining usage instruction rule sets is as follows:

ASSERTION EXAMPLES

In this example language, assertions are expressions that evaluate to true or false (i.e., are boolean expressions). Assignments can also be used to set the value of a variable. If all of the assertions in an instruction rule set evaluate true, then a transaction is allowed, and if so the values of variables as assigned (if any) may be used to direct the execution of the transaction.

The simplest payment instruction rule set consists of the following text, as it will always evaluate to true:

true;

Let's add more assertions with logical operators, some simple expressions and literals. Here's what it looks like now:

not false or false and true;

12.3 >= 7;

('12/05/2004' >= now) != (TransactionAmount * 2 <= 'USD 4.10');

The above payment instruction rule sets will always evaluate to true (as long as it's before Dec. 5, 2004).

Expressions in this example language are similar to those in Perl or C with respect to operator precedence. To illustrate, look at the following expression:

5 +5 * 10 == 55;

The above evaluates to true, because it is equivalent to:

(5 +(5 * 10)) == 100;

More generally, the precedence of operator evaluation is in the following order:

1) Literals, blackboard dereferences, and expressions in parentheses ( )
2) negate—not !
3) times * div /, left to right
4) minus - plus +, left to right
5) equals == notEquals != lessThan < greaterThan > lessThanOrEquals <= greaterThanOr Equals >=, in, notIn
6) and &&, left to right
7) or ||, left to right Also like C or Perl, white space is ignored in this example language, so tabs, spaces and newlines are not significant (except within string quotes, where exact formatting is preserved).

ASSIGNMENT EXAMPLES

You can create variables and set their values by making assignment statements. An assignment statement looks like this:

type Name := expression;

The following statement creates a variable, of money type, called MyFavoriteAmount, and sets the value to USD 7.99:

money MyFavoriteAmount := 'USD 7.99';

Variables do not change value throughout the evaluation of a payment instruction rule set. There can be multiple assignment statements for a variable (even in different payment instruction rule sets), but the values all have to agree, or it will be treated as an assertion failure. Variables are stored in the blackboard, which means that you can dereference them in assertions. Variables assigned in a payment instruction rule set (or another payment instruction rule set evaluated at the same time) can be used in any expression.

CONTEXT BLACKBOARD

Doing expressions with literals is fairly useless, since they always evaluate to the same result. In practice, payment instruction rule sets are evaluated against some set of context data, which in this example language are stored in a memory area called a blackboard. In this example, a blackboard is a simple map of string keys to scalar values. The string keys typically start with a capital letter. The names are case-sensitive. The blackboard provides data that is specific to an event.

To dereference blackboard data in an expression, the reference name is simply included in an expression:

TransactionAmount / 2 >= 'USD 5.00';

Blackboard dereferences can be used in any expression where a scalar value could go.

Variables stored in the blackboard are either global or private. Private variables can be used only by a specific payment instruction rule set (e.g., a sender, recipient or caller), while global variables can be used in expressions by any of the payment instruction rule sets.

In this example, variables are assigned a single value which does not change. Different variables have different sources for their value. For example, some variables are assigned their value within a payment instruction rule set, some are specified by the transaction authorization system ("TAS"), and some are passed in by a caller in a pay request message.

The chart below indicates variables that are defined for every pay request message, along with the source of each variable's value. In addition, payment instruction rule sets can create their own variables using assignment statements. These variables are global; for example, a variable created by an assignment statement in the sender's payment instruction rule set can be used in an expression in the recipient's instruction. User-specified variable names should start with an identifying sequence of characters specific to the user to avoid colliding with TAS-defined variable names and other user-defined variables. For example, variable names defined by Bob's Surf Shack could all start with 'BobsSurfShack'.

With a few exceptions, all global variables can either be passed in by a caller in a pay request message, or can be specified in any of the payment instruction rule sets—thus, current sources shown in the chart below are a convention only. Exceptions to this include variables with values specified by TAS, and the fact that at least one token has to be passed into the incoming authorization message, and any other tokens to be used have to be reachable. For example, if the CallerToken is the only token provided in a pay request message, then the corresponding payment instruction rule set could indicate the SenderToken or the RecipientToken or both. If it only indicates the SenderToken, then the sender's payment instruction rule set could indicate the RecipientToken, and vice versa.

| GLOBAL VARIABLES | | | |
|---|---|---|---|
| Variable Name | Source | Type | Description |
| TransactionTimestamp | specified by TAS | datetime | The date and time of the transaction |
| TransactionID | specified by TAS | string | The ID of the transaction |
| TotalFeeAmount | specified by TAS | money | The total amount of the fee paid to TAS for this transaction. |
| SenderFractionOfFees | passed in by caller in pay request message | number | The fraction of the TAS fees that the sender will pay. Value must be between 0 and 1 |
| RecipientFractionOfFees | passed in by caller in pay request message | number | The fraction of the TAS fees that the recipient will pay, with a value between 0 and 1 |
| CallerFractionOfFees | passed in by caller in pay request message | number | The fraction of the TAS fees that the caller will pay, with a value between 0 and 1 |
| TransactionAmount | passed in by caller in pay request message | money | The amount of the transaction |
| TransactionDescription | passed in by caller in pay request message | string | A human readable description of what's being purchased. Stored with the transaction and used when displaying the transaction for reporting and auditing. |
| TransactionData | passed in by caller in pay request message | string | Data provided by the caller regarding this transaction. For example, the caller could store an XML description of the service being sold. This data is stored with the transaction but it is opaque to TAS |
| SenderToken | passed in by caller in pay request message | string | Token referring to sender's payment instruction rule set |
| RecipientToken | passed in by caller in pay request message | string | Token referring to recipient's payment instruction rule set |
| CallerToken | passed in by caller in pay request message | string | Token referring to caller's payment instruction rule set |
| PaymentMethod | specified by sender's payment instruction rule set | string | Specifies the type of financial instrument used as the source of funds. one of: ACH, credit card, account transfer |
| PaymentInstrument | specified by sender's payment instruction rule set | string | Specifies the reference of the financial instrument used as the source of funds |
| SenderWinsTimeLimit | specified by recipient's payment instruction rule set | duration | Specifies the maximum time after the TransactionTimestamp a sender can automatically obtain a refund by registering a dispute. The amount of the refund is limited by SenderWinsRefundFraction |
| SenderWinsRefundFraction | specified by recipient's payment instruction rule set | number | Specifies for what fraction of the TransactionAmount a sender can automatically obtain a refund by registering a dispute. The dispute must be registered within the time specified by SenderWinsTimeLimit. |

PRIVATE VARIABLES

The private variables listed in the chart below are provided for each payment instruction rule set such that each payment instruction rule set gets its own copy of each of these variables. For example, the data in these references are different for the sender than for the recipient. The recipient can not access the sender's values and vice versa.

| Variable Name | Source | Type | Description |
| --- | --- | --- | --- |
| MyTokenUseCount | specified by TAS | number | The number of transactions approved by this token, optimistically including the current transaction |
| MyTokenUseTotalAmount | specified by TAS | money | The total amount of all transactions approved by this token, optimistically including the current transaction |
| MyFeeAmount | specified by TAS | money | The amount of the fee paid by this payment instruction rule set. For example, for the caller's instruction, this is equal to CallerFractionOfFees times TotalFeeAmount |
| MyRole | specified by TAS | string | The role of the party for which this token is being used in the transaction. One of: sender, recipient, caller |
| MyTokenID | specified in payment instruction rule set or passed in to install payment instruction rule set message | string | a user-meaningful ID for the payment instruction rule set |
| MyTokenDescription | specified in payment instruction rule set or passed in to install payment instruction rule set message | string | a user-meaningful human-readable description of the payment instruction rule set |
| MyTokenData | specified in payment instruction rule set or passed in to install payment instruction rule set message | string | user-meaningful machine-readable data related to the payment instruction rule set |
| MyTransactionID | sender, recipient and caller values each passed in by caller in pay request message | string | An ID for the transaction that is meaningful only to the sender, recipient or caller. Stored with the transaction |
| MyTransactionDescription | sender, recipient and caller values each passed in by caller in pay request message | string | A human readable description of what's being purchased that is meaningful only to the sender, recipient or caller. Stored with the transaction. |
| MyTransactionData | sender, recipient and caller values each passed in by caller in pay request message | string | Data provided by the caller regarding this transaction that is meaningful only to the sender, recipient or caller. For example, the recipient could store an XML description of the service being sold. This data is stored with the transaction but it is opaque to TAS |

COMMENTS

Comments start with the pound sign (#) and cause the rest of the line to be ignored. For multi-line comments, put a # at the start of each line.

this is a comment that spans more than one line

LANGUAGE CHARACTERISTICS

While in some embodiments the language may include temporal aspects such as looping constructs and/or recursion, in this example there are no such temporal aspects or branching statements. Data types include boolean, number, string, datetime, duration, and money. Operators are as follows:

| | |
| --- | --- |
| == | equals: true if the left and right sides are equal |
| != | notEquals: true if the left and right sides are not equal |
| < | lessThan |
| > | greaterThan |
| < | lessThanOrEquals |
| >= | greaterThanOrEquals |
| <= | lessThanOrEquals |
| := | assignment: assigns the left hand side to the value of the right hand side |
| + | addition |
| − | unary negate or subtraction |
| * | multiply |
| / | divide |
| && | and |
| \|\| | or |
| ! | not |

LITERALS
    BOOLEAN
true false

NUMBER

123

0.234

5%

Any integer is allowed, up to $2^{31}-1$. Negative values are achieved via the 'negate' operation. Decimal numbers are also supported, and are not stored as floating-point numbers. Numbers start with a digit, so a leading zero is used for decimal numbers between zero and one. Expressing a number as a percentage is also supported.

STRING

'any text'

String literals are enclosed in single quotes. Double quotes are not currently used.

DATETIME now

'YYYY-MON-DD'

'YYYY-MON-DD HH:MM:SS AM'

The 'now' literal returns the current time. The quoted text that follows this pattern can be compared with. The datetime keyword works with quoted strings, not string expressions.

DURATION

'10 days'

The duration literal specifies a period of time, and can be added to dates to form new dates. A variety of math operations are available.

'1 year 2 months 3 days 10 hours 30 minutes'

'P1Y2M3DT10H30M'

The above 2 literals styles are both supported. The second one translates to 1 year, 2 months, 3 days, 10 hours, and 30 minutes. The second form of the duration literal follows the definition of the duration from the W3C XML Schema Specification. From http://www.w3.org/TR/xmlschema-2/#duration:

The lexical representation for duration is the [USO 8601] extended format PnYn MnDTnH nMnS, where nY represents the number of years, nM the number of months, nD the number of days, 'T' is the date/time separator, nH the number of hours, nM the number of minutes and nS the number of seconds.

MONEY

'USD 1.00' money('USD', TokenTransactionCount * 0.05)

Money literals can be specified by a currency code and a number literal, or a currency code and an expression returning a number. See http://www.bsi-global.com/iso4217currency for more information on currency codes, including a table listing all currency codes. The set of allowable currency codes is not limited to those specified by ISO 4217, but ISO 4217 currency codes will be recognized.

OPERATIONS AND BUILT-IN FUNCTIONS

In the following section, lhs and rhs stand for the left-hand-side operand and the right-hand-side operand, respectively.

NEGATEOPERATION

- rhs negate rhs allowed types: integer, double, duration, money

NOTOPERATION

! rhs not rhs allowed types: boolean

OROPERATION lhs or rhs lhs || rhs allowed types: boolean

ANDOPERATION lhs and rhs lhs && rhs allowed types: boolean

INOPERATION lhs in (rhs1, rhs2, rhs3 . . . )

allowed types: all types lhs and rhs should be the same type, except that integer and double types can be compared. The in operator is shorthand for, and exactly equivalent to, the following:

lhs == rhs1 or lhs == rhs2 or lhs == rhs3 . . .

NOTINOPERATION lhs notIn (rhs1, rhs2, rh3 . . . )

allowed types: all types lhs and rhs should be the same type, except that integer and double types can be compared. The notIn operator is shorthand for, and exactly equivalent to, the following:

lhs != rhs1 and lhs != rhs2 and lhs != rhs3 . . .

EQUALSOPERATION lhs equals rhs lhs == rhs allowed types: all types lhs and rhs should be the same type, except that integer and double types can be compared.

NOTEQUALSOPERATION lhs notEquals rhs lhs != rhs allowed types: all types lhs and rhs should be the same type, except that integer and double types can be compared.

LESSTHANOPERATION lhs lessThan rhs lhs < rhs allowed types: integer, double, money, datetime, duration lhs and rhs should be the same type, except that integer and double types can be compared.

GREATERTHANOPERATION lhs greaterThan rhs lhs > rhs allowed types: integer, double, money, datetime, duration lhs and rhs should be the same type, except that integer and double types can be compared.

LESSTHANOREQUALSOPERATION lhs lessThanOrEquals rhs lhs >= rhs allowed types: integer, double, money, datetime, duration lhs and rhs should be the same type, except that integer and double types can be compared.

GREATERTHANOREQUALSOPERATION lhs greaterThanOrEquals rhs lhs >= rhs
   allowed types: integer, double, money, datetime, duration
   lhs and rhs should be the same type, except that integer and double types can be compared.
     ADDOPERATION lhs plus rhs lhs + rhs
   allowed types: integer, double, money, datetime, duration
   Integer and double can be operated on, which will result in a double unless both operands are integers.
   Operations on money require that both lhs and rhs be the money type.
   A duration can be added to a duration, resulting in a duration.
   A datetime can be added to a duration or a duration can be added to a datetime, resulting in a datetime.
     SUBOPERATION lhs minus rhs lhs − rhs
   allowed types: integer, double, money, datetime, duration
   Integer and double can be operated on, which will result in a double unless both operands are integers.
   Operations on money require that both lhs and rhs be the money type.
   A duration can be subtracted from a duration, resulting in a duration.
   A duration can be subtracted from a datetime, a datetime must be the lhs and a duration must be the rhs, resulting in a datetime.
     MULTOPERATION lhs times rhs lhs * rhs
   allowed types: integer, double, money, duration
   Integer and double can be operated on, which will result in a double unless both operands are integers.
   For money, money can be multiplied by an integer or double, resulting in money.
   For duration, a duration can be multiplied by an integer, resulting in a duration.
     DIVOPERATION lhs div rhs lhs / rhs
   allowed types: integer, double, money
   Integer and double can be operated on, which will result in a double unless both operands are integers.
   For money, money can be divided by an integer or double, the lhs must be a money value and the rhs must be an integer or double, resulting in money.
     MINFUNCTION min(lhs, rhs)
   allowed types: integer, double, money, datetime, duration
   lhs and rhs should be the same type, except that integer and double types can be compared.
     MAXFUNCTION max(lhs, rhs)
   allowed types: integer, double, money, datetime, duration
   lhs and rhs should be the same type, except that integer and double types can be compared.

MODFUNCTION mod(lhs, rhs)
   allowed types: integer
   Results in the integer remainder of dividing lhs and rhs.
     CATFUNCTION cat(lhs, rhs)
   allowed types: string
   Results in the combined string of lhs and rhs.
     GETCURRENCYCODE getCurrencyCode(rhs)
   allowed types: money
   Returns the currency code as a string.

PARSE GRAMMAR

Tokens:
   OR = "||";
   AND = "&&";
   NOT = "!";
   EQUALS = "==";
   NOT_EQUALS = "!=";
   L_THAN = "<";
   G_THAN = ">";
   LT_EQ = "<=";
   GT_EQ = ">=";
   PLUS = "+";
   MINUS = "−";
   ASTERIK = "*";
   DIV = "/";
   ASSIGN = ":=";
   ASSERTION;

////////////////////////////////////////////////////////////////

// Parser Rules instructionSet
   : (statement)+
   ;

statement
   : ("duration"
   | "money"
   | "datetime"
   | "string"
   | "number"
   )?
   BB_REFERENCE ASSIGN
   expression STATEMENT_END
   | exp:expression STATEMENT_END
   ;

// expressions expression
   : andExp ((OR | "or") andExp)*
   ;

andExp
   : compareExp ((AND | "and") compareExp)*
   ;

compareExp
   : addExp
   ((EQUALS | "equals"
     | NOT_EQUALS | "notEquals"
     | L_THAN | "lessThan"
     | G_THAN | "greaterThan"
     | LT_EQ | "lessThanOrEquals"
     |GT_EQ | "greaterThanOrEquals"

```
    4) addExp
  | ("in" | "notIn")
     LPAREN expression (COMMA expression)* RPAREN
  )
  ;
addExp
  : multExp
  ((PLUS | "plus"
    | MINUS | "minus"
    ) multExp)*
  ;
multExp
  : unaryExp
  ((ASTERIK | "times"
    | DIV | "div"
    ) unaryExp)*
  ;
unaryExp
  : (MINUS | "negate"
  | NOT | "not"
  ) scalarExp
  | scalarExp
  ;
scalarExp
  : literal
  | function
  | BB_REFERENCE
  | LPAREN expression RPAREN
  ;
// functions
function
  : minFunction
  | maxFunction
  | catFunction
  | getCurrencyCodeFunction
  ;
minFunction
  : "min" LPAREN expression (COMMA expression)+ RPAREN
  ;
maxFunction
  : "max" LPAREN expression (COMMA expression)+ RPAREN
  ;
catFunction
  : "cat" LPAREN expression (COMMA expression)+ RPAREN
  ;
getCurrencyCodeFunction
  : "getCurrencyCode" LPAREN expression RPAREN
  ;
// literals
literal
  : booleanLiteral
  | numberLiteral
  | dateTimeLiteral
  | durationLiteral
  | stringLiteral
  | moneyLiteral
  ;
booleanLiteral
  : "true"
  | "false"
  ;
moneyLiteral
  : "money" LPAREN QUOTED_LITERAL COMMA expression RPAREN
  ;
numberLiteral
  : NUMBER_LITERAL (PERCENT)?
  ;
dateTimeLiteral
  : "dateTime" LPAREN expression RPAREN
  | "now"
  ;
durationLiteral
  : "duration" LPAREN expression RPAREN
  ;
stringLiteral
  : QUOTED_LITERAL
  ;
LEXICAL DEFINITIONS
// character classifications
DOT : '.';
LPAREN : '(';
RPAREN : ')';
COMMA : ',';
STATEMENT_END : ';';
PERCENT : '%';
protected QUOTE_CHAR : '\'';
protected DIGIT_CHAR : ('0' ... '9');
protected ALPHA_CHAR : ('a' ... 'z' | 'A' ... 'Z');
protected NAME_CHAR : (ALPHA_CHAR | DIGIT_CHAR | '_');
protected OPERATOR_CHAR
  : ('|' | '&' | '!' | '<' | '>' | '=' | '+' | '-' | '*' | '/' | ':')
  ;
// skip all whitespace
WHITESPACE
  : (' '
  | '\t'
  | '\n'
  | '\r'
  )+
  ;
// token classifications
BB_REFERENCE
  : ALPHA_CHAR (NAME_CHAR)*
  ;
NUMBER_LITERAL
  : (DIGIT_CHAR)+ ('.' (DIGIT_CHAR)+)?
  ;
QUOTED_LITERAL
  : QUOTE_CHAR
    (~('\n' | '\'')
```

```
| '\n'
)*
QUOTE_CHAR
;

OPERATOR
    : OPERATOR_CHAR (OPERATOR_CHAR)?
;

COMMENT
    : '#' ~('\n' | '\r')
    ('\n'
    | '\r')+
;
```

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

The invention claimed is:

1. A method for a computing system of a third-party authorization system to automatically provide financial payments from bank accounts of parties in accordance with predefined instructions of the parties, the method comprising:
    receiving multiple requests that are each for a financial payment to be provided from a provider party to a recipient party, each of the requests including an indication of a reference that was previously associated by the authorization system with a payment instruction set defined by the provider party for use in controlling payments from a bank account of the provider party, the reference for use in indicating the defined payment instruction set associated with the reference; and
    for each of the received requests for a financial payment to be provided from a provider party to a recipient party, automatically providing the requested financial payment if it is determined to be authorized by,
        obtaining the defined payment instruction set that is associated with the reference included in the request;
        automatically determining whether the obtained payment instruction set authorizes providing the requested financial payment to the recipient party from an indicated bank account of the provider party; and
        if it is determined that the obtained payment instruction set authorizes the providing of the requested financial payment, automatically withdrawing from the indicated bank account of the provider party an amount that is at least the requested financial payment and providing at least a portion of the requested financial payment to the recipient party.

2. The method of claim 1 including, before receiving each request including an indication of a reference associated with a payment instruction set defined by a provider party, creating the payment instruction set in response to one or more instructions from the provider party and generating the reference for the payment instruction set.

3. The method of claim 1 wherein each request for a financial payment to be provided from a provider party to a recipient party includes information about the recipient party, and wherein the automatic determining of whether an obtained payment instruction set authorizes providing a requested financial payment to a recipient party is based at least in part on the included information about the recipient party.

4. The method of claim 1 wherein each request for a financial payment to be provided from a provider party to a recipient party includes information about a transaction with which the financial payment is associated, and wherein the automatic determining of whether an obtained payment instruction set authorizes providing a requested financial payment to a recipient party is based at least in part on the included information about the transaction.

5. The method of claim 1 wherein each automatic determining of whether an obtained payment instruction set authorizes providing a requested financial payment to a recipient party from an indicated bank account of a provider party includes using information about the recipient party and/or about the provider party that is automatically obtained.

6. The method of claim 1 wherein each automatic determining of whether an obtained payment instruction set authorizes providing a requested financial payment to a recipient party from an indicated bank account of a provider party includes interacting with a computing system of a bank that provides the indicated bank account to the provider party, the bank being unrelated to the authorization system.

7. The method of claim 1 wherein each of the payment instruction sets include one or more conditions to be satisfied in order to authorize the providing of a requested financial payment.

8. The method of claim 1 wherein each of the payment instruction sets specify one or more criteria for determining whether the payment instruction set authorizes a payment.

9. The method of claim 1 wherein each of the payment instruction sets includes one or more conditions regulating types of payments that the payment instruction set can authorize, one or more conditions regulating types of transactions associated with a payment that the payment instruction set can authorize, and one or more conditions regulating types of parties to whom the payment instruction set can authorize that payments be provided.

10. The method of claim 1 wherein each of the payment instruction sets is defined by a provider party in such a manner as to associated with the indicated bank account of the provider party from which amounts will be withdrawn for payments authorized by the payment instruction set.

11. The method of claim 1 wherein each withdrawing of an amount from an indicated bank account of a provider party includes performing one or more debit transactions using Automated Clearing House ("ACH") system.

12. The method of claim 11 wherein each providing of at least a portion of a requested financial payment to a recipient party includes performing one or more credit transactions using the ACH system.

13. The method of claim 1 wherein each withdrawing of an amount from an indicated bank account of a provider party is performed using electronic funds transfer.

14. The method of claim 1 wherein each withdrawing of an amount from an indicated bank account of a provider party as part of a response to a received request for a financial payment to be provided to a recipient party is performed by the authorization system on behalf of the recipient party.

15. The method of claim 1 wherein each withdrawing of an amount from an indicated bank account of a provider party is performed by the authorization system in such a manner that the authorization system is the recipient of the withdrawn amount, and wherein each providing of at least a portion of a requested financial payment to a recipient party is performed by the authorization system in such a manner that the authorization system is the provider of the portion of the requested financial payment.

16. The method of claim 1 wherein each indicated bank account of a provider party is a bank checking account.

17. The method of claim 1 wherein each indicated bank account of a provider party is a bank savings account.

18. The method of claim 1 wherein each indicated bank account of a provider party is a financial account containing funds of the provider party that may be withdrawn for authorized payments.

19. The method of claim 1 wherein each request for a financial payment to be provided from a provider party to a recipient party that includes an indication of a reference is received from the recipient party after the provider party provides the reference to the recipient party for use in obtaining the financial payment from the bank account of the provider party.

20. The method of claim 19 wherein each of the recipient parties is a retailer, wherein each of the provider parties is a consumer, and wherein each of the requests for financial payments involve acquisition of one or more items from one of the retailers by one of the consumers.

21. The method of claim 1 wherein each request for a financial payment to be provided from a provider party to a recipient party that includes an indication of a reference is received from the provider party.

22. The method of claim 1 wherein each request for a financial payment to be provided from a provider party to a recipient party is part of a potential transaction between the provider party and the recipient party, such that the potential transaction is completed after the providing of the portion of the requested financial payment to the recipient party.

23. The method of claim 1 wherein, for each of at least some of the requests, the amount withdrawn from the indicated bank account of the provider party exceeds the requested financial payment by a determined amount, and wherein the determined amount is retained by the authorization system as a fee.

24. The method of claim 1 wherein, for each of at least some of the requests, the portion of the requested financial payment provided to the recipient party is less than the requested financial payment by a determined amount, and wherein the determined amount is retained by the authorization system as a fee.

25. The method of claim 1 wherein each request for a financial payment to be provided from a provider party to a recipient party further includes an indication of a second distinct reference that was previously associated by the authorization system with a distinct payment instruction set defined by the recipient party, and wherein the automatic withdrawing of the amount and the providing of the portion of the requested financial payment for a request are performed only if the distinct payment instruction set for that request is automatically determined to authorize receipt of the requested financial payment from the provider party.

26. The method of claim 1 including providing information to each of multiple provider parties regarding processing of requests that are for financial payments to be provided by the provider party.

27. The method of claim 1 including providing information to each of multiple recipient parties regarding processing of requests that are for financial payments to be provided to the recipient party.

28. The method of claim 1 including receiving an indication from a provider party of a dispute related to a financial payment provided from the provider party to a recipient party, and automatically returning to the provider party at least a portion of the financial payment.

29. The method of claim 28 wherein the automatically returning to a provider party of at least a portion of a financial payment related to an indicated dispute includes verifying that the indicated dispute lacks predefined indicia of fraudulence.

30. The method of claim 1 wherein the automatic determining of whether an obtained payment instruction set authorizes providing a requested financial payment to a recipient party from an indicated bank account of a provider party includes verifying that the requested payment amount lacks predefined indicia of fraudulence.

31. The method of claim 1 including, after automatic determining by the authorization system that an obtained payment instruction set authorizes providing a requested financial payment to a recipient party from an indicated bank account of a provider party, modifying the obtained payment instruction set in response to one or more indications from the provider party and in such a manner that the modified payment instruction set will not authorize providing another requested financial payment to the recipient party.

32. The method of claim 1 including, after automatic determining by the authorization system that an obtained payment instruction set associated with an indicated reference authorizes providing a requested financial payment to a recipient party from an indicated bank account of a provider party, receiving another request that includes an indication of the reference and that is for another financial payment to be provided from the provider party to the recipient party and automatically determining that the obtained payment instruction set associated with the indicated reference does not authorize providing the requested another financial payment to the recipient party.

33. The method of claim 1 wherein each of the references is a reference token, wherein each of the payment instruction sets is a payment instruction rule set containing one or more rules used for controlling payments, wherein each of the requested financial payments is associated with a transaction, and wherein the authorization system is a transaction authorization system.

34. The method of claim 1 wherein each of the references is for use by a provider party in providing indications to others of the defined payment instruction set associated with the reference when using the defined payment instruction set to authorize payments from the provider party.

35. The method of claim 1 wherein each of the indicated references is anonymous such that a recipient party cannot obtain information from the reference about the payment instruction set associated with the reference.

36. The method of claim 1 wherein each of the indicated references is anonymous such that a recipient party cannot obtain information from the reference about the provider party that defined the payment instruction set associated with the reference.

37. A computer-readable medium whose contents enable a computing system to facilitate automatically authorizing payments between parties, by performing a method comprising:

receiving an indication of a potential payment from a first party to a distinct second party, the potential payment associated with a transaction between the first and second parties;

receiving an indication of a reference provided by the first party for use in determining whether to authorize the transaction, the reference having an associated defined payment instruction set for the first party that specifies one or more criteria for determining whether the payment instruction set authorizes a transaction involving a payment;

obtaining an indication from an authorization system distinct from the first and second parties whether the potential payment is automatically authorized to be paid from funds available in a financial account associated with the first party, the authorizing of the potential payment based at least in part on the defined payment instruction set associated with the indicated reference; and if the potential payment is automatically authorized, facilitating performance of the potential transaction.

38. The computer-readable medium of claim 37 wherein the method further includes, under control of a computing system of the authorization system, obtaining the defined payment instruction set associated with the indicated reference, automatically determining whether the potential payment is automatically authorized based at least in part on the defined payment instruction set, and, if the potential payment is automatically determined to be authorized, obtaining the potential payment from the first party and providing the potential payment to the second party on behalf of the first party.

39. The computer-readable medium of claim 37 wherein the method further includes, if the potential payment is automatically authorized, providing of the potential payment by the first party from the funds available in the financial account.

40. The computer-readable medium of claim 37 wherein the method further includes, if the potential payment is automatically authorized, receiving of the potential payment by the second party from the funds available in the financial account.

41. The computer-readable medium of claim 37 wherein the providing by the first party of the reference for use in determining whether to authorize the transaction between the first and second parties includes providing the reference to the second party, and wherein the indications of the potential payment and of the reference are received from the second party.

42. The computer-readable medium of claim 37 wherein the computer-readable medium is a memory of a computing system.

43. The computer-readable medium of claim 37 wherein the computer-readable medium is a data transmission medium transmitting a generated data signal containing the contents.

44. The computer-readable medium of claim 37 wherein the contents are instructions that when executed cause the computing system to perform the method.

45. The computer-readable medium of claim 37 wherein the method further comprises, before the receiving of the indication of the potential payment, providing instructions to the authorization system from the first party to create the payment instruction set, and receiving the reference for the created payment instruction set from the authorization system.

46. The computer-readable medium of claim 37 wherein the authorizing of the potential payment is further based on whether the second party is authorized to accept the potential payment from the first party.

47. The computer-readable medium of claim 37 wherein the obtaining of the indication from the authorization system further includes requesting the obtained indication from the authorization system, the requesting including providing information to the authorization system about the transaction and about the indicated potential payment from the first party to the second party.

48. The computer-readable medium of claim 37 wherein the financial account associated with the first party is a bank account of the first party, and wherein the payment instruction set is defined by the first party to be associated with the bank account in such a manner that payments authorized by the payment instruction set will be withdrawn from the bank account.

49. The computer-readable medium of claim 37 wherein the specified one or more criteria include multiple conditions to be satisfied in order to authorize providing of an indicated financial payment.

50. The computer-readable medium of claim 49 wherein the multiple conditions include one or more conditions regulating types of payments that the payment instruction set can authorize, one or more conditions regulating types of transactions associated with a payment that the payment instruction set can authorize, and one or more conditions regulating types of parties to whom the payment instruction set can authorize that payments be provided.

51. The computer-readable medium of claim 37 wherein the method further comprises withdrawing the potential payment from the financial account of the first party via one or more debit transactions using Automated Clearing House ("ACH") system.

52. The computer-readable medium of claim 51 wherein the method further comprises providing at least a portion of the potential payment to a second financial account of the second party via one or more credit transactions using the ACH system.

53. The computer-readable medium of claim 37 wherein the second party is a retailer, the first party is a consumer, and the transaction associated with the indicated potential payment includes acquisition of one or more items from the retailer by the consumer.

54. The computer-readable medium of claim 37 wherein the method further comprises receiving an indication of a second distinct reference that was previously associated by the authorization system with a distinct second payment instruction set defined by the second party, and wherein the authorizing of the potential payment is further based at least in part on the second payment instruction set.

55. The computer-readable medium of claim 37 wherein the method further comprises, after the facilitating of the performance of the potential transaction, receiving an indication from the first party of a dispute related to the potential transaction, and automatically returning to the first party at least a portion of the potential payment.

56. The computer-readable medium of claim 37 wherein the authorizing of the potential payment is further based on verifying that the potential payment associated with the transaction lacks predefined indicia of fraudulence.

57. The computer-readable medium of claim 37 wherein the method further comprises, after the facilitating of the performance of the potential transaction, modifying the payment instruction set in response to one or more indications from the first party and in such a manner that the modified payment instruction set will not authorize providing another indicated payment to the second party.

58. The computer-readable medium of claim 37 wherein the method further comprises, after the facilitating of the performance of the potential transaction, receiving an indication of a distinct second potential payment to be provided from the first party to the second party, the second potential payment being associated with a distinct second transaction between the first and second parties, and automatically determining that the payment instruction set does not authorize providing the second potential payment to the second party.

59. The computer-readable medium of claim 37 wherein the indicated reference is anonymous such that the second party cannot obtain information from the reference about at least one of the first party and the payment instruction set associated with the reference.

60. The computer-readable medium of claim 37 wherein the indicated reference is a reference token, wherein the payment instruction set is a payment instruction rule set containing one or more rules used for controlling payments, and wherein the authorization system is a transaction authorization system.

* * * * *